(12) United States Patent
Gassi

(10) Patent No.: US 9,054,870 B2
(45) Date of Patent: Jun. 9, 2015

(54) INFORMATION SECURITY BASED ON EIGENDECOMPOSITION

(71) Applicant: Donatello Apelusion Gassi, Somerville, MA (US)

(72) Inventor: Donatello Apelusion Gassi, Somerville, MA (US)

(*) Notice: Subject to any disclaimer, the term of this patent is extended or adjusted under 35 U.S.C. 154(b) by 74 days.

(21) Appl. No.: 13/678,053

(22) Filed: Nov. 15, 2012

(65) Prior Publication Data

US 2014/0112473 A1 Apr. 24, 2014

Related U.S. Application Data

(60) Provisional application No. 61/717,049, filed on Oct. 22, 2012.

(51) Int. Cl.
| | |
|---|---|
| *G06F 21/00* | (2013.01) |
| *H04L 29/06* | (2006.01) |
| *H04L 9/28* | (2006.01) |
| *H04L 9/06* | (2006.01) |
| *G06F 17/16* | (2006.01) |

(52) U.S. Cl.
CPC ... *H04L 9/28* (2013.01); *H04L 9/06* (2013.01)

(58) Field of Classification Search
CPC ....... G06F 17/06; H04L 25/0246; H04L 9/28; H04L 9/06; H04W 24/00
USPC ........... 380/255; 708/520; 342/378; 375/350, 375/267; 341/78; 713/176
See application file for complete search history.

(56) References Cited

U.S. PATENT DOCUMENTS

| | | | |
|---|---|---|---|
| 4,595,911 A * | 6/1986 | Kregness et al. | ................ 341/78 |
| 6,779,111 B1 | 8/2004 | Gehrmann et al. | |
| 7,237,115 B1 * | 6/2007 | Thomas et al. | ................ 713/176 |
| 7,697,646 B2 | 4/2010 | Mosier et al. | |

(Continued)

FOREIGN PATENT DOCUMENTS

| | | | |
|---|---|---|---|
| WO | WO 2011161202 A2 * | 12/2011 | |
| WO | 2014066279 | 5/2014 | |

OTHER PUBLICATIONS

Pei, Soo-Chang; Chia-Chang Wen; Jian-Jiun Ding; "Closed-Form Orthogonal DFT Eigenvectors Generated by Complete Generalized Legendre Sequence"; Circuits and Systems I: Regular Papers, IEEE Transactions on vol. 55, Issue: 11; Publication Year: Dec. 2008; pp. 3469-3479.*

(Continued)

*Primary Examiner* — Andrew Nalven
*Assistant Examiner* — Courtney Fields
(74) *Attorney, Agent, or Firm* — DeLizio Law, PLLC

(57) ABSTRACT

Provided is an eigendecomposition cipher. Input data is formatted into a numerical representation and arranged as a data matrix. Eigendecomposition is performed on the data matrix to determine at least a first component matrix (of eigenvalues) and a second component matrix (of eigenvectors). The eigendecomposition process is modified to ensure that the first component matrix has a diagonalized matrix of eigenvalues. Provided are additional features of shaping, compression, and message generation for an eigendecomposition-based cipher. A first message is generated based upon the first component matrix. A second message is generated based upon the second component matrix. The first and second messages comprise separate indecipherable parts of the input data. The first and second messages may be transmitted or stored separately such that the source data may not be recovered without both messages.

31 Claims, 14 Drawing Sheets

(56) References Cited

U.S. PATENT DOCUMENTS

| | | | |
|---|---|---|---|
| 7,706,478 | B2 | 4/2010 | Moran et al. |
| 7,730,540 | B1 | 6/2010 | Woirhaye et al. |
| 7,895,254 | B2* | 2/2011 | Ketchum et al. .............. 708/520 |
| 2003/0228017 | A1 | 12/2003 | Beadle et al. |
| 2007/0036353 | A1 | 2/2007 | Reznik et al. |
| 2007/0211815 | A1* | 9/2007 | Pan et al. ...................... 375/267 |
| 2008/0056416 | A1* | 3/2008 | Moiser .......................... 375/350 |
| 2009/0022049 | A1 | 1/2009 | Zeng |
| 2009/0136023 | A1 | 5/2009 | Pan et al. |
| 2011/0038445 | A1 | 2/2011 | Zhou et al. |
| 2011/0060917 | A1 | 3/2011 | Pastoriza et al. |

OTHER PUBLICATIONS

Choi, Sung Jin et al., "An Efficient Dispersal and Encryption Scheme for Secure Distributed Information Storage", School of Information and Communications Engineering, Sungkyunkwan University Springer-Verlag Berlin Heidelberg 2003, 10 pages.

Han, Keesook J. et al., "Scalable Cryptographic Scheme for Networked Multimedia Applications", International Conference on Image Processing, Department of Electrical and Computer Engineering.

Junod, Pascal et al., "Perfect Diffusion Primitives for Block Ciphers Building Efficient MDS Matrices", Lecture Notes in Computer Science vol. 3357 2005, 16 pages.

Lai, Xuejia, "On the Design and Security of Block Ciphers", Swiss Federal Institute of Technology Zurich for the degree of Doctor of Technical Sciences 1992, 122 pages.

Sorensen, Danny C., "Numerical methods for large eigenvalue problems", Department of Computational and Applied Mathematics Rice University Dec. 2001, 69 pages.

Subramanian, Kaushik, "Unified Approach to Feature Extraction and Information Security for Image Processing Systems", Waran Research Foundation 46-B, Mahadevan Street, West Mambalam Chennai-600 033, India 2008, 6 pages.

"PCT Application No. PCT/US2013/066002 International Search Report", Feb. 20, 2014, 7 pages.

* cited by examiner $$format\ (data) \rightarrow A_1, A_2, \ldots A_k$$

FORMATTING OF INPUT BITSTREAM
INTO PLURALITY OF MATRICES
WITH FLOATING POINT ELEMENTS $$910 \quad V = \begin{bmatrix} v_{11} & v_{12} & v_{13} \\ v_{21} & v_{22} & v_{23} \\ v_{31} & v_{32} & v_{33} \end{bmatrix}$$

$$920 \quad \widetilde{V} = \begin{bmatrix} v_{11}/v_{11} & v_{12}/v_{12} & v_{13}/v_{13} \\ v_{21}/v_{11} & v_{22}/v_{12} & v_{23}/v_{13} \\ v_{31}/v_{11} & v_{32}/v_{12} & v_{33}/v_{13} \end{bmatrix}$$

$$930 \quad \widetilde{V} = \begin{bmatrix} 1 & 1 & 1 \\ v_{21}/v_{11} & v_{22}/v_{12} & v_{23}/v_{13} \\ v_{31}/v_{11} & v_{32}/v_{12} & v_{33}/v_{13} \end{bmatrix}$$

FIG. 9

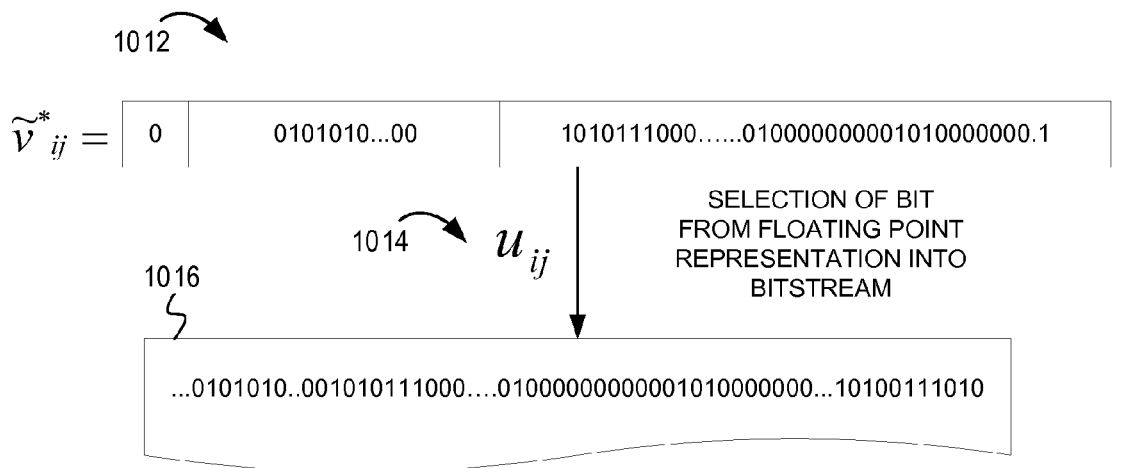
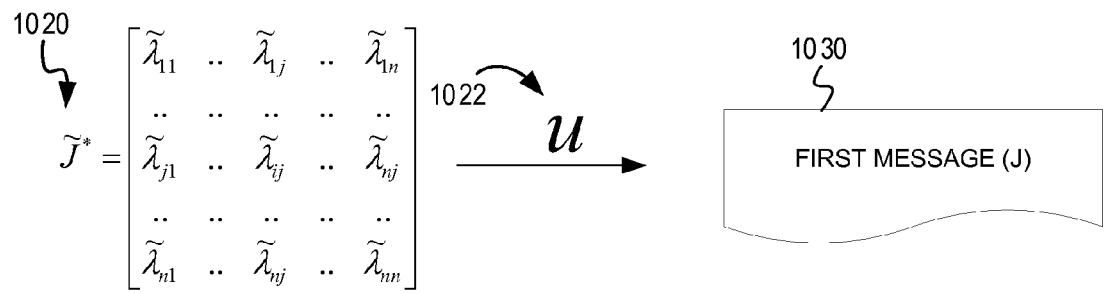
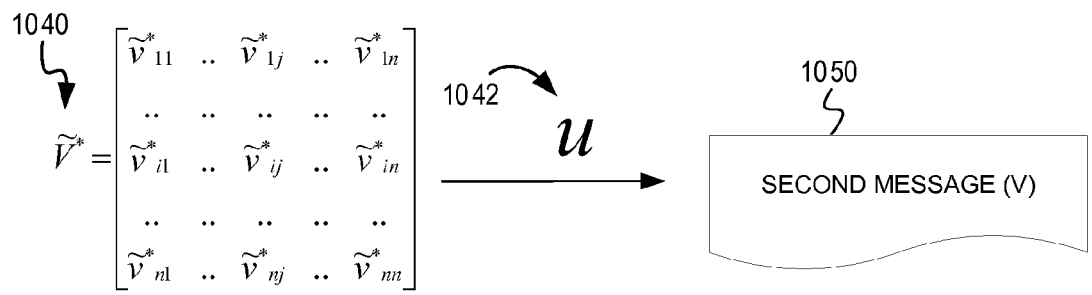
FIG. 10

1210

| Data matrix size | 8x8 |
|---|---|
| Element type | double floating point complex numbers |
| Number of bits per element | 64 bits (real) & 64 bits (imaginary) |
| Padding per floating point number | 14 bits |
| data bits in per floating point number | 50 bits |
| number of elements | 128 elements (real and imaginary) |
| amount of data per data matrix | 6400 bits |
| size of J Matrix (shaping) | 1024 bits |
| size of V Matrix | 8192 bits |
| size of V Matrix (compressed) | 7168 bits |
| size growth | 28% |
|  |  |
| Original File: | 100 Mb |
| First message payload | 16 Mb |
| Second message payload | 112 Mb |

1220

| iteration number | size of orig (M) | total size | (excludes header) small (J) Size | big (V) size |   |
|---|---|---|---|---|---|
| 1 | 100 | 128 | 16 | 112 | 1231 |
| 2 | 16 | 20.48 | 2.56 | 17.92 | 1232 |
| 3 | 2.56 | 3.2768 | 0.4096 | 2.8672 | 1233 |
| 4 | 0.4096 | 0.524288 | 0.065536 | 0.458752 | 1234 |
| 5 | 0.065536 | 0.08388608 | 0.01048576 | 0.07340032 | 1235 |

INFORMATION SECURITY BASED ON EIGENDECOMPOSITION

CROSS-REFERENCE TO RELATED APPLICATIONS

This application claims the priority benefit of U.S. Provisional Application Ser. No. 61/717,049, filed Oct. 22, 2012.

BACKGROUND

Embodiments of the inventive subject matter generally relate to the fields of information security and data processing.

Traditional methods for securing data rely on encryption keys. For example, symmetric key encryption and public key encryption utilize keys as an input to an encryption algorithm. Early technologies utilized one-time pad solutions, in which a secret random key is used to encrypt plaintext and decrypt cipher-text using a pre-shared secret random key (or pad). Block ciphers utilizing a symmetric key also require identical keys used for encryption and decryption. The strength of symmetric key algorithms depends on the length, randomness and exchange process associated with the symmetric key. A stream cipher is similar to symmetric key cipher and uses a symmetric key combined with a pseudorandom cipher digit stream (key stream). The encryption of each digit is dependent on the current key in a series of keys. The keys change in a serial rotation based upon a random seed value. Symmetric key systems and stream ciphers are plagued with problems associated with generating random seeds or keys and key exchange.

More recent methods of securing data rely upon substitutions and permutations of block data. A substitution-permutation network (SPN) is a technique in cryptography which requires multiple rounds of block cipher algorithms involving substitutions and permutations of input data at each round. At each round of the substitutions and permutations, a "round key" may be used. The round key is typically a variant of a starting key which is modified in a predictable way (for example using substitutions and/or permutations) for each round. In a variation of substation-permutation network, product ciphers combine two or more transformations in a predetermined algorithm. Feistel ciphers are a type of product cipher in which an iterated cipher uses an internal function called a round function in conjunction with a series of sub-keys for each round. Even for SPNs, Feistel ciphers, or other product ciphers, an initial key or seed must be determined and exchanged.

Some cryptographic hash functions avoid the problems associated with keys by iteratively hashing blocks of binary data. A cryptographic hash algorithm is a widely-used tool that creates a "fingerprint", or a "message digest" of a file, message or block of data that can be used for digital signatures, message authentication codes, and many other security applications in the information infrastructure. For example, secure hash algorithms (SHA) or other cryptographic hash algorithms simply hash bits from the source data in multiple rounds. The source data is segmented into blocks (e.g. 512 bits or 1024 bits) and the cryptographic hash is performed multiple times for each block.

Improvements to cryptography would allow for the secure storage or transmission of data.

SUMMARY

Provided is a method and apparatus for matrix eigendecomposition cipher. Input data is formatted into a numerical representation and arranged as a data matrix. Matrix decomposition is performed on the data matrix to determine, based upon eigendecomposition, at least a first component matrix and a second component matrix. The first component matrix may have a canonical form, such as a Jordan normal form or a diagonalized matrix of eigenvalues. A first message is generated based upon the first component matrix. A second message is generated based upon the second component matrix. The first and second messages comprise separately transmittable indecipherable parts of the input data. Provided are additional features of shaping, compression, and message generation for an eigendecomposition-based cipher. The generated messages may be transmitted or stored separately such that the source data is indecipherable without both messages.

BRIEF DESCRIPTION OF THE DRAWINGS

The present embodiments may be better understood, and numerous objects, features, and advantages made apparent to those skilled in the art by referencing the accompanying drawings in which like reference numerals refer to substantially similar features.

FIG. 9 depicts another example of optimizing or compressing a second component matrix having eigenvectors in accordance with an embodiment of this disclosure.

FIG. 10 depicts an example of generating first and second messages based upon the first and second component matrices in accordance with an embodiment of this disclosure.

FIG. 12 depicts data expansion and optimization calculations in accordance with an embodiment of this disclosure.

DESCRIPTION OF EMBODIMENT(S)

Figure 1:
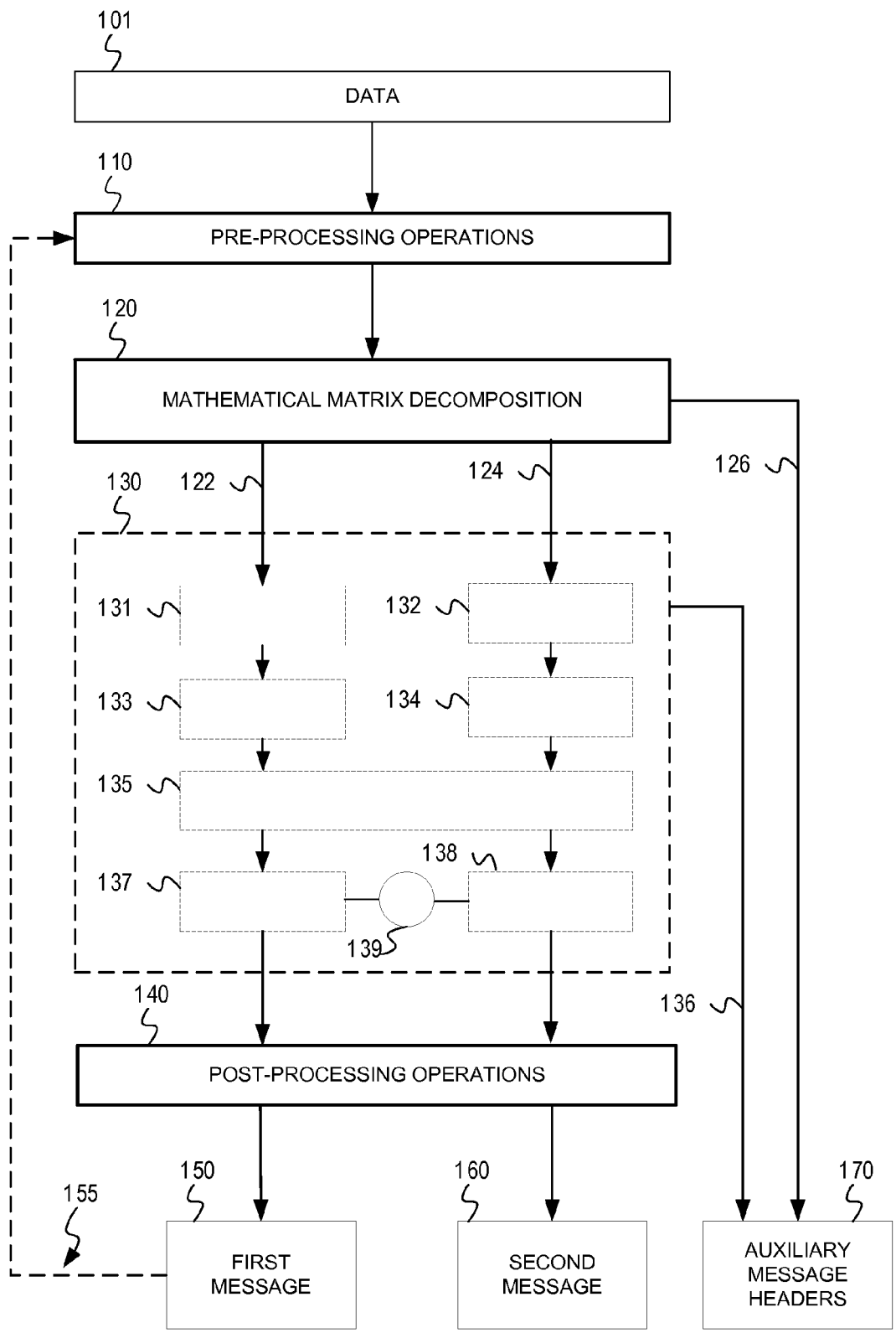
FIG. 1 depicts an example flowchart illustrating secure data transmission in accordance with an embodiment of this disclosure.

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

In this disclosure, data must be transmitted from a first apparatus to a second apparatus. The type of data is unimportant—for example, the data may be text, video, audio, image, or other types of user data. Alternatively, the data may be confidential or sensitive information that is stored, generated, or received by the first apparatus. Regardless of the type of data or the source of the data, this disclosure is related to the secure transmission of the data from the first apparatus to a second apparatus. As described in detail below, the data may be transmitted via multiple transmission media, including wireless or wire-line connections, removable memory components, or public infrastructure. In an example embodiment, the data may be transmitted in parts such that an interception of a single transmission will not compromise the confidentiality of the data. In another embodiment, the data may be stored as separate parts (e.g. separate storage facilities, perhaps mixing secure and unsecure storage media) so that the confidentiality of the data is maintained except for a decoder having access to all the parts.

Data is formatted to create numerical values populating one or more data matrices. Matrix decomposition is used to determine component matrices for each data matrix. In later decoding, the component matrices may be used to determine the original data matrices. However, the component matrices by themselves do not bear a resemblance to the original data matrices. Furthermore, the component matrices may be processed (e.g. compressed, transformed, encrypted, truncated, or shaped) to further obscure the component matrices or optimize the component matrices as separately transmittable parts of the original data. Information security is provided by transmitting the component matrices as separate messages via one or more communication media. A recipient recovers the component matrices by reversing the processing operations. The recovered component matrices may then be used to determine the original data matrices and reconstruct the original data at the recipient.

In the mathematical discipline of linear algebra, matrix decomposition is a factorization of a matrix into a product of matrices. There are many different matrix decompositions. In this disclosure, examples are described in relation to eigendecomposition (also referred to as spectral decomposition). In the mathematical discipline of linear algebra, eigendecomposition is the factorization of a matrix into a canonical form, whereby the matrix is represented in terms of its eigenvalues and eigenvectors. While examples herein are described in relation to eigendecomposition, it should be understood that other types of matrix decomposition may be used to determine a product of component matrices.

Eigenvalues of a matrix A are the solutions $\lambda$ to the characteristic equation $det(A-\lambda I)=0$, where det is the determinant of the matrix formed by $A-\lambda I$ and I is the n-by-n identity matrix (value of 1 in the diagonal and 0 in all other elements). A diagonalizable matrix of size n-by-n has n distinct eigenvalues. Diagonalization is the process of finding a corresponding diagonal matrix for a diagonalizable matrix. Eigendecomposition is a type of diagonalization in which the diagonal entries of the diagonal matrix J are the eigenvalues $\lambda$ of the matrix A. Eigendecomposition, also called spectral decomposition, is applicable to a square matrix A with distinct eigenvalues. Eigendecomposition is mathematically described by the formula $A=VJV^{-1}$, where J is a diagonal matrix formed from the eigenvalues $\lambda$ of A, and the columns of V are the corresponding eigenvectors of A. The relationship between the diagonal matrix formed from the eigenvalues and the matrix of corresponding eigenvectors is based on eigendecomposition.

A square matrix which is not diagonalizable is called defective. In linear algebra, a defective matrix is a square matrix that does not have a complete basis of eigenvectors, and is therefore not diagonalizable. In particular, an n×n matrix is defective if and only if it does not have n linearly independent eigenvectors. A complete basis is formed by augmenting the eigenvectors with generalized eigenvectors, which are necessary for solving defective systems of ordinary differential equations and other problems. A defective matrix always has fewer than n distinct eigenvalues, since distinct eigenvalues always have linearly independent eigenvectors. In particular, a defective matrix has one or more eigenvalues $\lambda$ with algebraic multiplicity m>1 (that is, they are multiple roots of the characteristic polynomial), but fewer than m linearly independent eigenvectors associated with $\lambda$. However, every eigenvalue with multiplicity m always has m linearly independent generalized eigenvectors.

Due to the nature of eigendecomposition, a resulting diagonal matrix of eigenvalues represents key data in determining the content of the eigendecomposed matrix. The resulting matrix of eigenvectors represents characteristic vectors that are essentially meaningless (e.g. unintelligible, indecipherable) without the eigenvalues. Therefore, in one sense, the eigenvalues may be considered a cipher "key" in the eigendecomposition cipher, while the eigenvectors may be considered ciphered, encrypted or encoded data. As shown in this disclosure, the cipher "key" of eigenvalues is generated from the original data through the eigendecomposition process. Various other shaping, compression, and transformations described herein provide for greater obfuscation, encryption, and diffusion of the resulting ciphered data components.

Jordan decomposition is another example of matrix decomposition. The Jordan normal form generalizes the eigendecomposition to cases where there are repeated eigenvalues and the original matrix cannot be diagonalized. In linear algebra, a Jordan normal form (often called Jordan canonical form) of a linear operator on a finite-dimensional vector space is an upper triangular matrix of a particular form called a Jordan matrix, representing the operator on some basis. The form is characterized by the condition that any non-diagonal entries that are non-zero must be equal to 1, be immediately above the main diagonal (on the superdiagonal), and have identical diagonal entries to the left and below them. If the vector space is over a field K, then a basis on which the matrix has the required form exists if and only if all eigenvalues of M lie in K, or equivalently if the characteristic polynomial of the operator splits into linear factors over K. This condition is always satisfied if K is the field of complex numbers. The diagonal entries of the normal form are the eigenvalues of the operator, with the number of times each one occurs being given by its algebraic multiplicity. If the operator is originally given by a square matrix M, then its Jordan normal form is also called the Jordan normal form of M. Any square matrix has a Jordan normal form if the field of coefficients is extended to one containing all the eigenvalues of the matrix. In spite of its name, the normal form for a given M is not entirely unique, as it is a block diagonal matrix formed of Jordan blocks, the order of which is not fixed; it is conventional to group blocks for the same eigenvalue together, but no ordering is imposed among the eigenvalues, nor among the blocks for a given eigenvalue, although the latter could for instance be ordered by weakly decreasing size. The diagonal form for diagonalizable matrices, for instance normal matrices, is a special case of the Jordan normal form.

FIG. 1 depicts an example flowchart illustrating various embodiments of this disclosure. At 101, data is present in an original form. For example, the data may be a binary file associated with text, video, image, audio, or other information. At block 110, pre-processing operations may be performed on the data. For example, blocking and sequencing may be used to segment the data. The data may also be formatted into various types of numerical representations. In an example used in this disclosure (such as described in FIG. 4), the data is formatted as a series of floating point numbers and arranged to form one or more data matrices. In other implementations (such as described in FIG. 5), the data may be formatted as complex numbers and arranged to form one or more data matrices. The selection of complex numbers may be desirable in some implementations to improve eigendecomposition or to prevent data expansion resulting from eigendecomposition. It should be understood that the numerical representations described in this disclosure are examples only, and other numerical representations and formats are possible. In the examples provided herein, the data matrices are square matrices. However it is contemplated that other matrices may be used with aspects of this disclosure.

At block 120, mathematical matrix decomposition is performed for each data matrix. The mathematical matrix decomposition may include, for example, eigendecomposition, LU decomposition, singular value decomposition, spectral decomposition, or Jordan decomposition. In the examples described herein, eigendecomposition is used. As a result of the mathematical matrix decomposition, at least two component matrices (represented as arrows 122 and 124) are calculated. For example, a first component matrix 122 may comprise eigenvalues and a second component matrix 124 may comprise eigenvectors. In various examples described herein, a data matrix may be modified by predetermined transformation. Information related to the modification may be represented as a third matrix 126 including transformation values. The third matrix 126 is collected for later use in auxiliary message headers 170.

Returning to the first component matrix 122 and second component matrix 124, the first and second component matrices may be further processed (at optional block 130) for additional security or optimization. Processing may include shaping 131, 132 the component matrices. Processing may include optimizing or compressing 133, 134 the component matrices. It should be understood that a particular processing feature may act independently on each of the first and second matrices or the particular processing feature may act simultaneously and uniformly (shown as block 135) on the first and second matrices. Furthermore a processing feature may utilize one of the first and second component matrices in way that creates a dependency (shown as circle 130) between the first component matrix 137 and the second component matrix 138. Further examples of processing features are described in further detail below. It should be understood that processing features may include shaping, optimization, compression, encryption, substitution, permutation, hashing, or other processing features. Information used during processing features may also be captured (shown as arrow 136) and included in auxiliary message headers 170.

At block 140, post-processing operations are performed. Post-processing operations may include further layering of security protocols. Post-processing operations may also include serialization and/or packetizing of the processed first and second component matrices. Furthermore, the post processing operations 140 may include a verification process to confirm that the original input data may be properly recovered from processed first and second matrices resulting from one or more processing features. If the verification process fails, then parameters of the processing features may be adjusted and repeated. Alternatively, if the verification process fails, the processed first and second matrices may be discarded and the pre-processing operations (block 110), mathematical matrix decomposition (block 120), and processing operations (block 130) may be repeated with different system configurable options for the same data.

As output from the post processing operations 140, a first message 150 and a second message 160 are generated. Auxiliary message headers 170 may be generated based on information associated with the mathematical matrix decomposition 120 and/or processing 130. The auxiliary message headers 170 may be transmitted separately or in conjunction with either the first message 150 or the second message 160. In an example embodiment, the auxiliary message headers 170 are appended to the first message 150.

It should be understood that the first component matrix and the second component matrix may be different sizes. Furthermore, various processing features (such as compression) may result in a size disparity between the first component matrix and the second component matrix. For example, in the scenario where the first component matrix represents eigenvalues and the second component matrix represents eigenvectors, the shaping and compression of the first component matrix may result in a much smaller first message 150 than the second message 160. The eigenvalues may be considered the essence (or "DNA") of the original data matrix, while the eigenvectors simply represent seemingly random vectors. A change in the eigenvalues compromises the reconstruction of source matrix. Therefore, the first message (based upon the processed first component of eigenvalues) may be treated more securely and transmitted over a secure communication media. The second message (based upon the processed second component matrix of eigenvectors) may be a larger file with indecipherable data (e.g. unintelligible or meaningless without the eigenvalues) and may be transmitted over an unsecure communication media in some example embodiments. It should be noted that both messages (as well as the auxiliary message headers) are needed by the recipient to recover the original data.

In some embodiments, one or both of the first and second messages may be used as input data for a further iteration of the encoding algorithm. For example, at arrow 155, the first message 150 is used as second data and sent to the pre-processing operations 110, mathematical matrix decomposition 120, processing 130, and post-processing operations 140, resulting in two new messages (e.g. third message 150' and fourth message 160', not shown)

Figure 2:
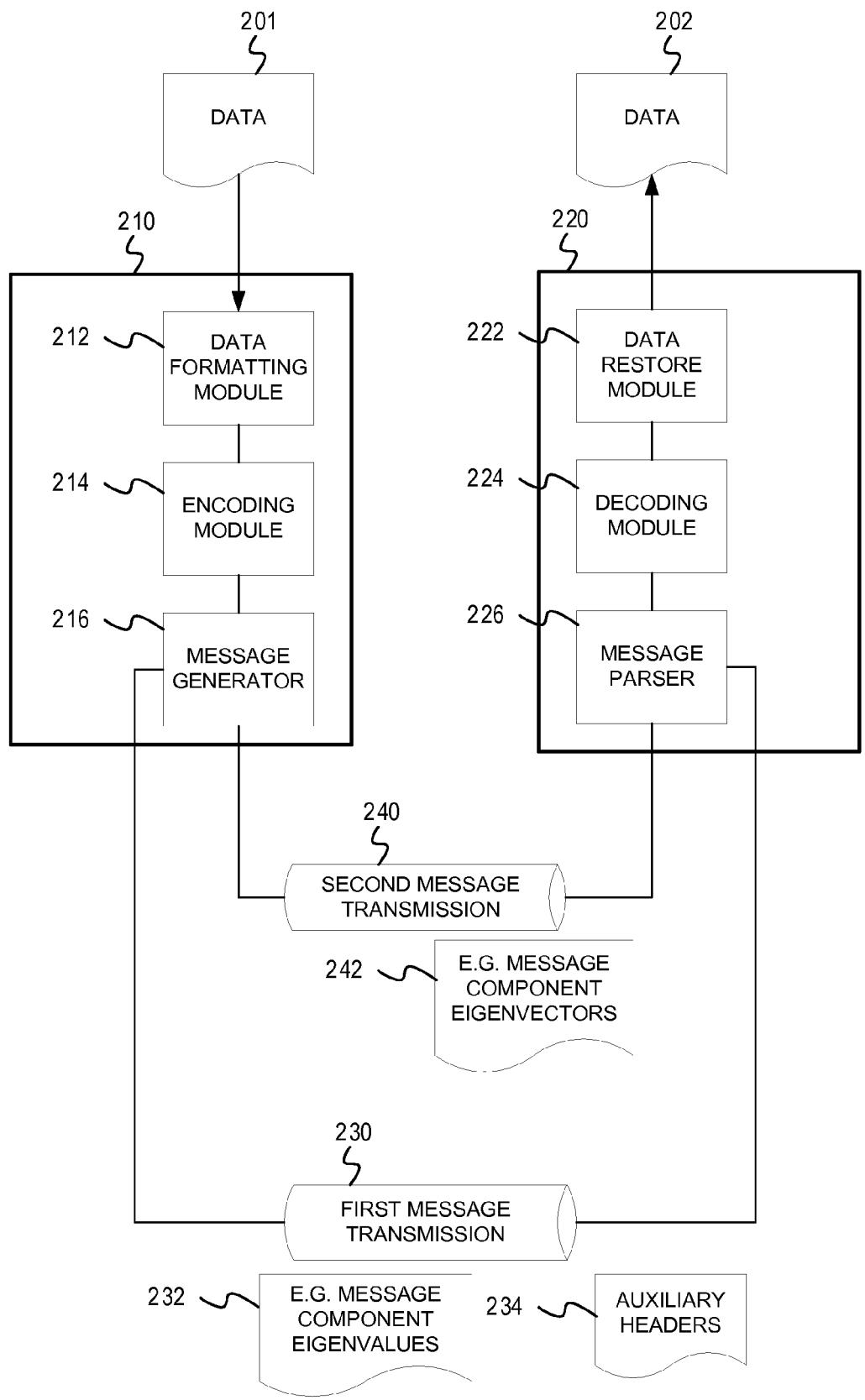
FIG. 2 depicts an example system diagram illustrating information security based on eigendecomposition in accordance with an embodiment of this disclosure.

FIG. 2 depicts an example system diagram illustrating information security based on eigendecomposition in accordance with an embodiment of this disclosure. At 201, data exists at a first apparatus 210. The first apparatus 210 includes a data formatting module 212, an encoding module 214, and a message generator 216. The data formatting module 212 formats the data into a plurality of data matrices. The encoding module 214 performs eigendecomposition of each data matrix. The encoding module 214 may also verify that matrix inversion is successful (e.g. the original data matrix can be recovered from the resulting eigendecomposition). In one embodiment, the matrix inversion is successful when the first component matrix only includes eigenvalues in the diagonal and zeros in all other elements (including the superdiagonal). If the eigendecomposition is unsuccessful (e.g. the decomposition results in a Jordan decomposition rather than diagonal eigenvalues) it may not be possible to recover the original data matrix from the resulting first and second component matrices. In such a case, the encoding module 214 may apply a transformation to the original data matrix and re-attempt eigendecomposition. For example, the transformation may alter the data matrix such that the resulting eigendecomposition can be successfully reversed. Such transformation enables the utilization of highly efficient numerical methods in the determination of eigenvalues and eigenvectors. A more detailed explanation of how the encoding module 214 may verify that the eigendecomposition is successful is provided in FIG. 6 below. The encoding module 214 may also perform other processing features, such as compression, encryption, shaping, optimization, etc. to the first and second component matrices.

Message generator 216 generates a first message based upon the first component matrix and a second message based upon the second component matrix. In the example of FIG. 2, the message generator 216 also transmits the first and second messages. The first message transmission 230 may be transmitted over a secure communication media (such as, but not limited to, an encrypted end-to-end connection, peer-to-peer communication session, secure digital memory media, etc.) or stored in a first storage media (such as a secure storage facility). The second message transmission 240 may be transmitted over an unsecure communication media (such as, but not limited to, a wireless connection, a public network connection, the Internet, website, etc.) or stored in a second storage media. In the example of FIG. 2, the first message includes information based upon the eigenvalues 232 and the auxiliary headers 234, while the second message includes information based upon the eigenvectors 242. The auxiliary headers 234 include meta data about the type of matrix decomposition, transformations, or processing features used in preparing the separate messages.

A second apparatus 220 is the recipient of the first and second messages. The second apparatus 220 includes a message parser 226, a decoding module 224, and a data restore module 222. The message parser 226 is capable of reversing the operations performed by the message generator 216. Specifically, the message parser 226 interprets the first and second messages to recover the auxiliary headers, first component matrix and second component matrix. The decoding module 224 is capable of reversing the operations performed by the encoding module 214. Specifically, the decoding module 224 utilizes the first component matrix and second component matrix to recover the original data matrix. The data restore module 222 is capable of reversing the operations performed by the data formatting module 212. Specifically, the data restore module 222 transforms the data matrix back to the binary data file 212 that is a copy of the original binary data file at 201.

Data Formatting

Figure 3:
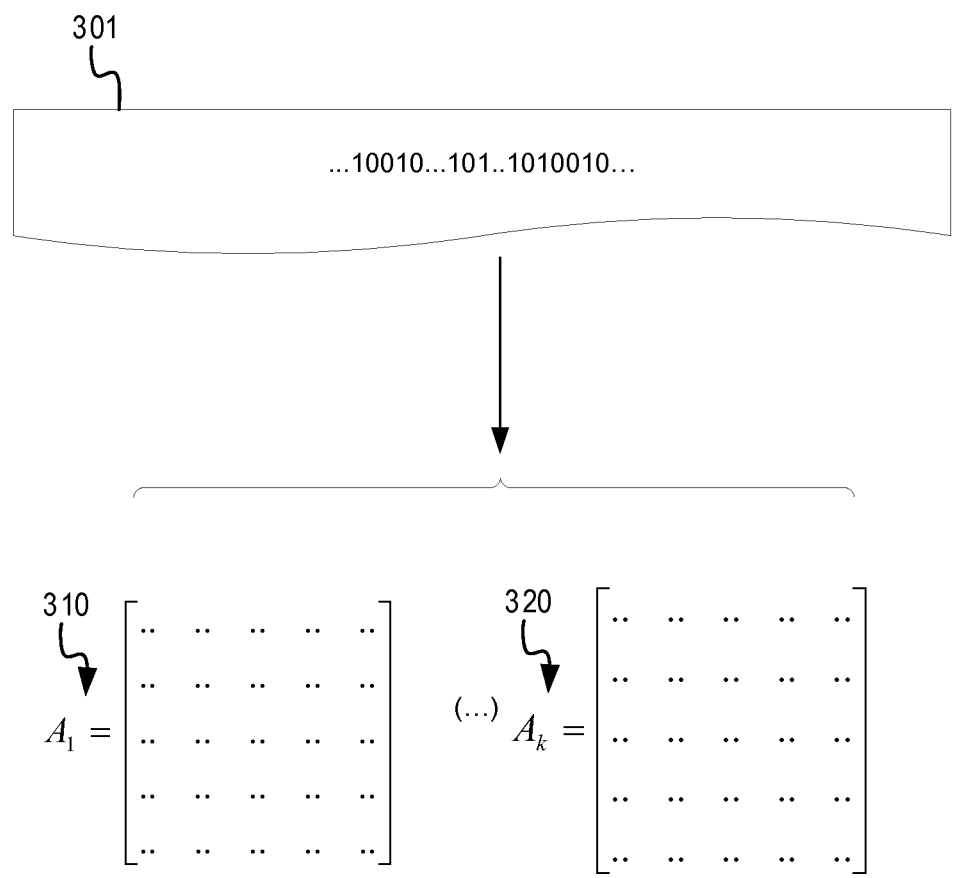
FIG. 3 depicts an example of formatting data prior to eigendecomposition in accordance with an embodiment of this disclosure.

FIG. 3 depicts an example of formatting data prior to eigendecomposition in accordance with an embodiment of this disclosure. Data 301 is represented as binary data without regard to the type or structure of data file (or stream). The binary data is "blocked" or segmented to create a plurality of data matrices $A_1$ (310) to $A_k$ (320). In the example, the values in data matrices 310, 310 are floating point numerical elements.

Figure 4:
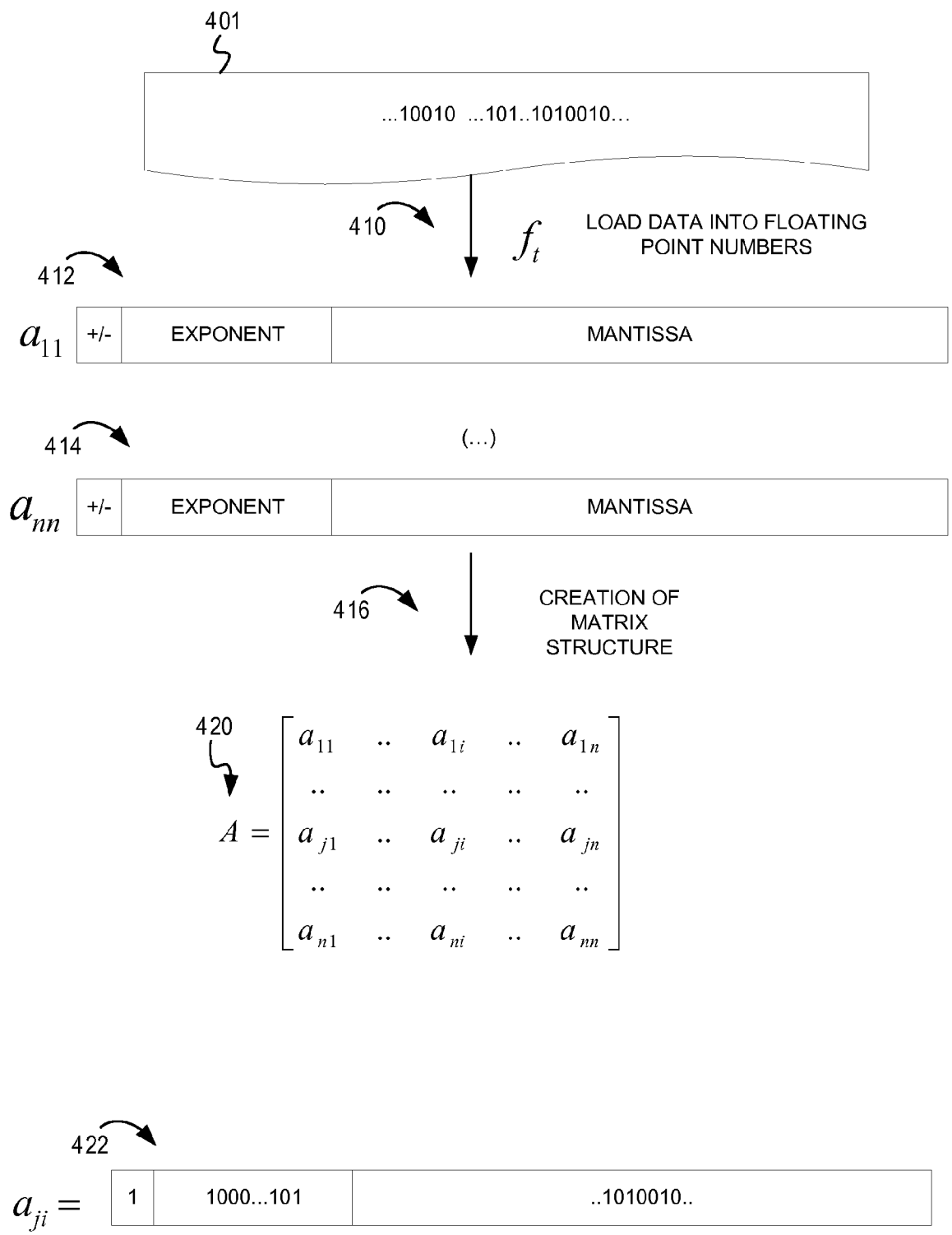
FIG. 4 depicts an example of formatting data as floating point numbers in a first data matrix in accordance with an embodiment of this disclosure.

FIG. 4 depicts an example of formatting data as floating point numbers in a first data matrix. Data 401 is passed through a data formatting function $f_t$ (at 410) which loads the binary data into floating point numbers. An example floating point number $a_{11}$ (412) shows the structure of a floating point number stored in an example computer processing system. The example floating point number 412 includes a sign bit, followed by an exponent portion and a mantissa portion. A single-precision floating point number in a computer number format occupies 4 bytes (32 bits) in computer memory. A single-precision floating point number includes one sign bit, 8 bits for the exponent portion, and 23 bits for the mantissa (also referred to as fraction). Alternatively, a double-precision floating point number in computer number format occupies 8 bytes (64 bits) and includes one sign bit, 11 bits for the exponent portion, and 52 bits for the mantissa.

A bit stream from the data 401 may be used to populate the bits of a floating point number sequentially. It should be noted, that in some implementations it may be preferable to add some padding bits, such as when there is not enough bits in the data 401 to complete a particular floating point number. Padding bits may also be used in the exponent and/or the mantissa portion of the floating point number. For example, in floating point number $a_{ji}$ (422), a first part (e.g. the first three bits) of the exponent portion is padded (e.g. padded with a predetermined value or values) before loading bits from the data 401 into exponent portion. In another example, the exponent portion may be set to a constant value without loading bits from the data 401. In a further example, the exponent portion may be set to a biased value that represents zero (e.g. "1000 . . . 0"). When loading bits from the data 401 into the mantissa, a number of least significant bits of the mantissa may be padded (e.g. with zeros).

One reason why padding may be used is to reduce the complexity of calculations for very large numbers. Another reason for using padding bits is that as eigendecomposition calculations or subsequent calculations are performed various multiplication or division operations may result in a loss of bit position or shifting of bits. By reserving parts of the mantissa and exponent, calculations made by the encoding module and decoding module will not lose fidelity and the calculations will be reversible. This padding of the bits of exponent and mantissa portions of the floating point numbers may be used for all of the floating point numbers in the data matrix, so long as the reverse process is used when recovering the data at the data recovery module.

The padding of the exponent part may also be done in consideration of the exponent encoding and bias. For example, padding the first and second bit of the exponent portion with 1 and 0 avoids the representation of sub-normal numbers or NaN. In floating point numbers, the exponent may be modified to an exponent bias so that the floating point number is offset (biased). Biasing is done because exponents have to be signed values in order to be able to represent both tiny and huge values, but two's complement, the usual representation for signed values, would make comparison harder. To avoid issues with signed values, the exponent is biased before being stored by adjusting its value to put it within an unsigned range suitable for comparison. By arranging the fields so that the sign bit is in the most significant bit position, the biased exponent in the middle, then the mantissa in the least significant bits, the resulting value will be ordered properly, whether it's interpreted as a floating point or integer value. This allows high speed comparisons of floating point numbers using fixed point hardware. When later interpreting the floating-point number, the bias is subtracted to retrieve the actual exponent. For a single-precision number, an exponent in the range −126 to +127 is biased by adding 127 to get a value in the range 1 to 254 (0 and 255 may have special meanings in computer processors). For a double-precision number, an exponent in the range −1022 to +1023 is biased by adding 1023 to get a value in the range 1 to 2046 (0 and 2047 have special meanings). For a quad-precision number, an exponent in the range −16382 to +16383 is biased by adding 16383 to get a value in the range 1 to 32766 (0 and 32767 have special meanings). Therefore, padding may include an offset value to adjust the exponent based on the type of floating point number being used in a particular implementation.

The quantity and locations of padding bits may be system adjustable or predetermined. As shown in further detail in FIG. 12, the amount of padding bits added to the data matrix may cause an expansion in the source data, and therefore in the resulting eigendecomposition. Conversely, the use of padding bits may provide fidelity through encoding and decoding, as well as reduce the likelihood of eigendecomposition failure. Therefore, a selection of the quantity of padding bits may be dependent upon the performance (e.g. speed) of the encoding, the size requirements, or other factors. In one example, a fixed number of padding bits (e.g. 14 padding bits) may be used in each floating point number. This effectively expands the size of the original data by 28% (64 bits per floating point number/50 bits of data) when formatting the data in the data matrix. In another example, if 10 padding bits are used per floating point number, the expansion would be lower (64 bits/54 bits of data=18.5% expansion) but the encoding operations may take longer.

The reason encoding operations may take longer is that each eigendecomposition is verified to make sure that the resulting component matrices may be recombined to yield the original data matrix. If the original data matrix cannot be recovered from the component matrices, then the original data matrix is modified and eigendecomposition is performed on the modified data matrix. Using too few padding bits may cause a loss of fidelity in the first decomposition, resulting in multiple operations of eigendecomposition and slowing the encoding process. In one embodiment, the number of padding bits are set at a low level and gradually increased as needed to speed the encoding process. Alternatively, the number of padding bits may be dynamic for each data matrix in a plurality of data matrices, and information about the number of padding used in each data matrix kept as auxiliary headers for use in the decoding process.

Returning to the loading of bits from the data 401, bits are populated into the floating point numbers from floating point number $a_{11}$ (412) to floating point number $a_{nn}$ (414). The floating point numbers are arranged (at 416) in a data matrix A 420. Any arrangement may be used to generate the data matrix A, as long as the reverse process is used when recovering the data at the data recovery module. For example, the floating point numbers may be arranged in rows first, columns first, or in a quasi-random distribution of floating point numbers in the data matrix A. Data matrix A 420 is shown as an n-by-n square data matrix. Any size of matrix may be used including non-square matrixes.

Selection of the matrix size may be dependent upon desired levels of cryptography, processing capabilities, or size of data to encode. For example, a smaller matrix size may be computationally less complex but may yield a lower cryptographic result. A larger matrix size may yield a higher cryptographic result but may be more computationally complex. A 4×4 square matrix will have more segmentation of the input data and less obfuscation of the eigenvectors upon eigendecomposition. An 8×8 square matrix requires less segmentation of the input data as compared to the 4×4 matrix and may yield more obfuscation of the eigenvectors upon eigendecomposition.

Figure 5:
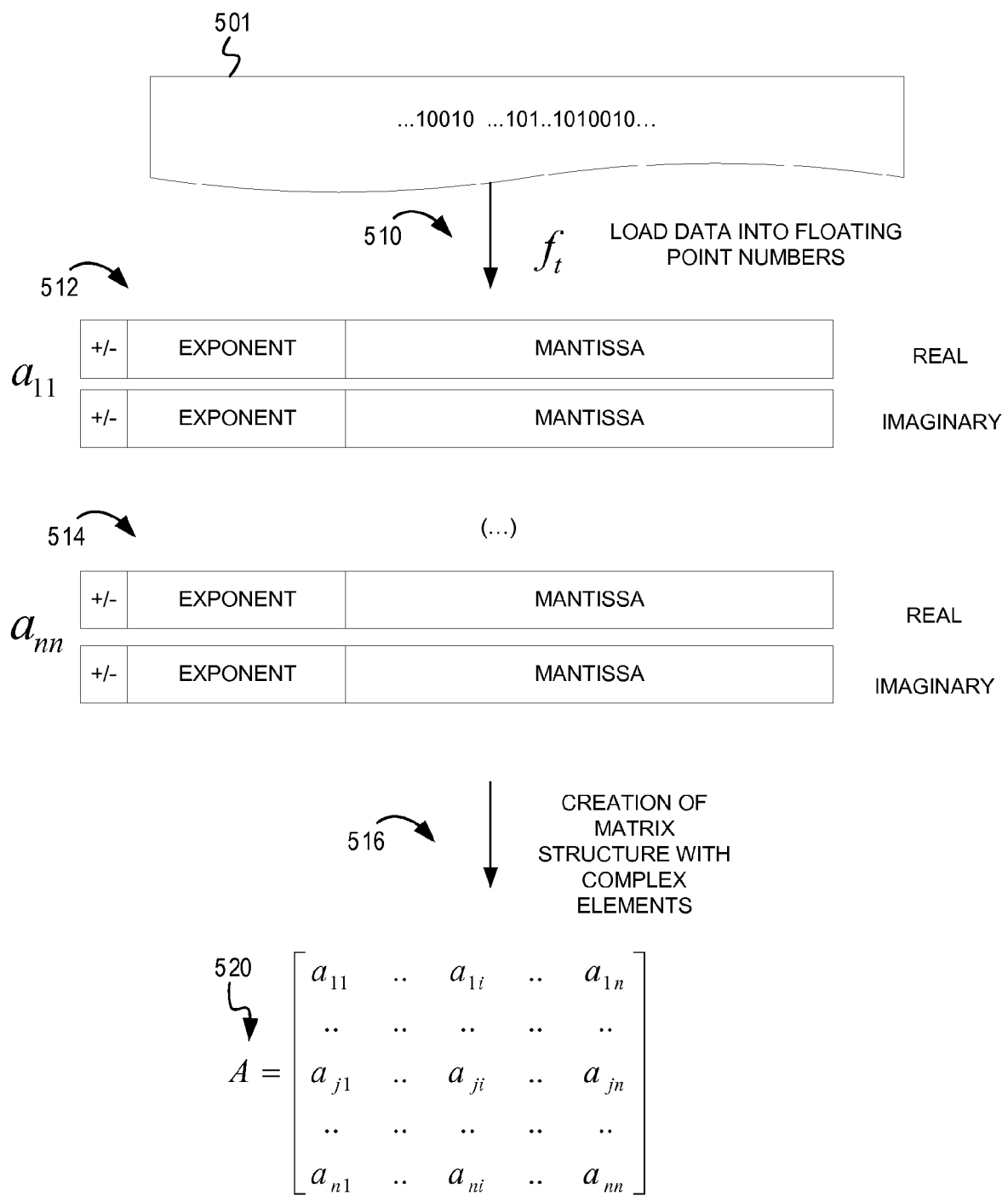
FIG. 5 depicts an example of formatting data as complex floating point numbers in a first data matrix in accordance with an embodiment of this disclosure.

FIG. 5 depicts an example of formatting data as complex floating point numbers in a first data matrix. As an alternative to FIG. 4, FIG. 5 utilizes complex numbers for each value in the data matrix A 520. In FIG. 5, data 501 is passed through a data formatting function $f_t$ (at 510) which loads the binary data into complex floating point numbers. An example complex floating point number $a_{11}$ (512) shows the structure of a complex floating point number. The complex floating point number 512, 514 has a real portion and an imaginary portion. The real portion and imaginary portion are used together as an element in the data matrix A 520. The complex floating point numbers are arranged (at 516) to create the data matrix A 520.

The selection of complex numbers for the original data matrix may improve the efficiency of the resulting cryptographic system. For example, considering a small data matrix (even of sizes 2×2 in an example) of floating point numbers. It is possible, or even likely, that eigendecomposition may result in complex numbers (real and imaginary parts) in the component matrices regardless of whether the original data matrix included only real numbers. Therefore, the size of the component matrices would dramatically increase (for example, doubling in size) the amount of memory or payload data than was needed for the original data. However, if the original data matrix is arranged with complex numbers initially, than the resulting eigendecomposition would also be complex numbers but would not substantially increase the size of the original data. Therefore, in one implementation, formatting the data as complex numbers in the first data matrix may prevent the later eigendecomposition process from causing data expansion.

The use of complex numbers in the first data matrix may also enable larger blocks of data to be stored in the each data matrix—which increases the indecipherability of the resulting component matrices. Eigendecomposition of the first data matrix may also be computationally more efficient. As described above with regard to padding in the floating point numbers, the encoding operations may be repeated if the first data matrix does not result in a successful eigendecomposition. For example, if the first data matrix cannot be recovered from the component matrices, then the first data matrix is modified (e.g. transformed) and the encoding process is repeated until eigendecomposition is successful. Multiple operations of eigendecomposition may slow the encoding process. However, eigendecomposition is less likely to fail when the first data matrix is arranged with complex numbers. The complex numbers (real and imaginary parts) causes more uniqueness in the elements that make up the first data matrix, resulting in fewer operations needed in the encoding process.

Figure 6:
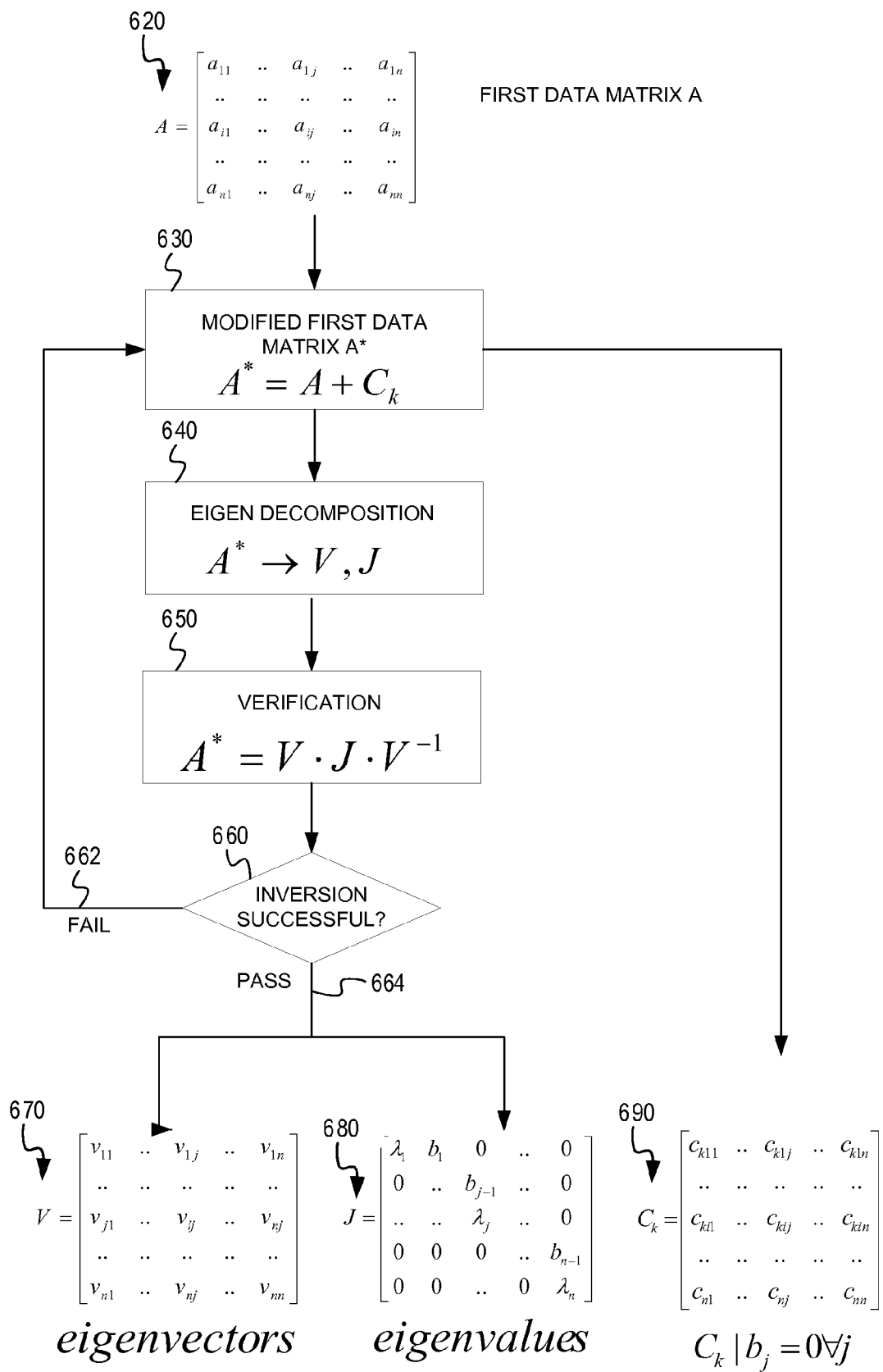
FIG. 6 depicts an example flowchart illustrating eigendecomposition of a first data matrix in accordance with an embodiment of this disclosure.

FIG. 6 depicts an example flowchart illustrating eigendecomposition of the first data matrix. In an example implementation, eigendecomposition is the first step in the encoding process. In other examples, the first data matrix may be encrypted, transformed, shifted, or otherwise modified prior to the eigendecomposition. Furthermore, if the first data matrix cannot be decomposed into a diagonalized matrix of eigenvalues and a matrix of eigenvectors, the first data matrix may be modified using a transformation (such as adding a known constant value $C_k$) and the eigendecomposition step repeated.

At 620, a first data matrix A contains values $a_{11}$ to $a_{nn}$. At block 630, the first data matrix A may be modified to create a modified first data matrix A*. For example, the first data matrix may be transformed using a mathematical operation (such as $A^*=A+C_k$. There are several methods of determining $C_k$. In a first example, $C_k$ is a predefined constant matrix which can be included (or referenced by an index number) in auxiliary headers such that the modification is reversible. In another example, $C_k$ may be a matrix of randomly or pseudo randomly generated values. In yet another example, $C_k$ may comprise a matrix of one or more user generated values (such as derived from a password or key). In yet another example, $C_k$ may comprise a matrix of one or more hash values (or some other variant) based upon the input data or a portion of the input data. In some implementations, $C_k$ may be a null value or the first data matrix may not be modified, prior to an initial attempt to perform eigendecomposition of the first data matrix.

At 640, eigendecomposition is performed. Eigendecomposition (of either the first data matrix A or the modified first data matrix A* results in two component matrices, a first component matrix J having eigenvalues λ and a second component matrix V having eigenvectors. The eigendecomposition may be represented by the mathematical formula A*→V, J. Eigendecomposition is a form of diagonalization where the first component matrix J has eigenvalues λ in the diagonal without other values (as opposed to Jordan decomposition which allows for one values to be in the superdiagonal in addition to the eigenvalues λ in the diagonal). In one implementation of the present subject matter, Jordan decomposition may be used in lieu of eigendecomposition. However, Jordan decomposition may utilize more processing capability to reconstruct the original data matrix. In the preferred embodiment, eigendecomposition is used to determine the first and second component matrices, where the first component matrix has eigenvalues λ in the diagonal.

The process for eigendecomposition in block 640 may utilize computer calculation algorithms and mathematical formulas. In one example, computer software determines unique eigenvalues based upon an input matrix and calculates the eigenvectors from the eigenvalues and the input matrix. In other examples, invertible matrices may be used to calculate either the eigenvectors or eigenvalues. In another example, more sophisticated calculations may be performed to reduce the number of processor calculations needed to generate the first and second component matrices.

The complexity of the problem for finding roots/eigenvalues of the characteristic polynomial increases rapidly with increasing the degree of the polynomial (the dimension of the vector space). There are exact solutions for dimensions below 5, but for dimensions greater than or equal to 5 there are generally no exact solutions and one has to resort to numerical methods to find them approximately. (In fact, since the roots of any polynomial can be expressed as eigenvalues of a companion matrix, the Abel-Ruffini theorem implies that there is no general algebraic solution for eigenvalues of 5×5 or larger matrices: any general eigenvalue algorithm is necessarily approximate, although in practice one can obtain any desired accuracy.) Worse, any computational procedure that starts by computing the coefficients of the characteristic polynomial can be very inaccurate in the presence of round-off error, because the roots of a polynomial are an extremely sensitive function of the coefficients. Efficient, accurate methods to compute eigenvalues and eigenvectors of arbitrary matrices were not known until the advent of the QR algorithm in 1961. Combining Householder transformation with LU decomposition offers better convergence than the QR algorithm. For large Hermitian sparse matrices, the Lanczos algorithm is one example of an efficient iterative method to compute eigenvalues and eigenvectors, among several other possibilities.

Returning to FIG. 6, at block 650 a verification step may be performed. The verification confirms that the first data matrix (or the modified first data matrix) can be successfully reconstructed using the first and second component matrices. Other ways of verification may be possible to determine whether the eigendecomposition at block 640 was successful. In the example at block 650, eigencomposition is performed (by the formula: $A^* = V \cdot J \cdot V^{-1}$) to verify that the eigendecomposition at block 640 resulted in component matrices that can be recombined. If reconstruction is not successful, at decision block 660, then the process returns to block 630 and the first data matrix is modified by another constant $C_k$. Computationally, it is efficient to attempt eigendecomposition and verify eigencomposition. If the eigencomposition is unsuccessful in reconstructing the matrix on which eigendecomposition was attempted, then the eigendecomposition was unsuccessful. By simply modifying the data matrix using a known transformation (such as adding the constant $C_k$), the modified data matrix may be more likely to result in a successful eigendecomposition. Using padding bits and complex double floating point numbers (both described above), it may be unlikely to require more than one or two iterations of blocks 630, 640, 640, 660.

At 660, if the verification passes 664, then the resulting first and second component matrices are represented as first component matrix J 680 and second component matrix V 670. If any constant $C_k$ was used to modify the first data matrix at 630, then the value of $C_k$ 690 is saved for each first data matrix A. If the value of $C_k$ 690 is a predetermined value, than an index or reference associated with $C_k$ may be saved.

As there may be multiple data matrices that are generated based upon the input data, the process of eigendecomposition is performed on each data matrix independently. Therefore, for a plurality of data matrices $A_1, A_2, \ldots A_k$, each data matrix may be modified, eigendecomposed, verified, and the resulting first and second component matrices (and constant) for each data matrix may be stored. The plurality of data matrices $A_1, A_2, \ldots A_k$ will be decomposed as a plurality of first component matrices $J_1, J_2, \ldots J_k$, a plurality of second component matrices $V_1, V_2, \ldots V_k$, and a plurality of constants $C_{k1}, C_{k2}, \ldots C_{kk}$ (or indices or references thereof).

Figure 7:
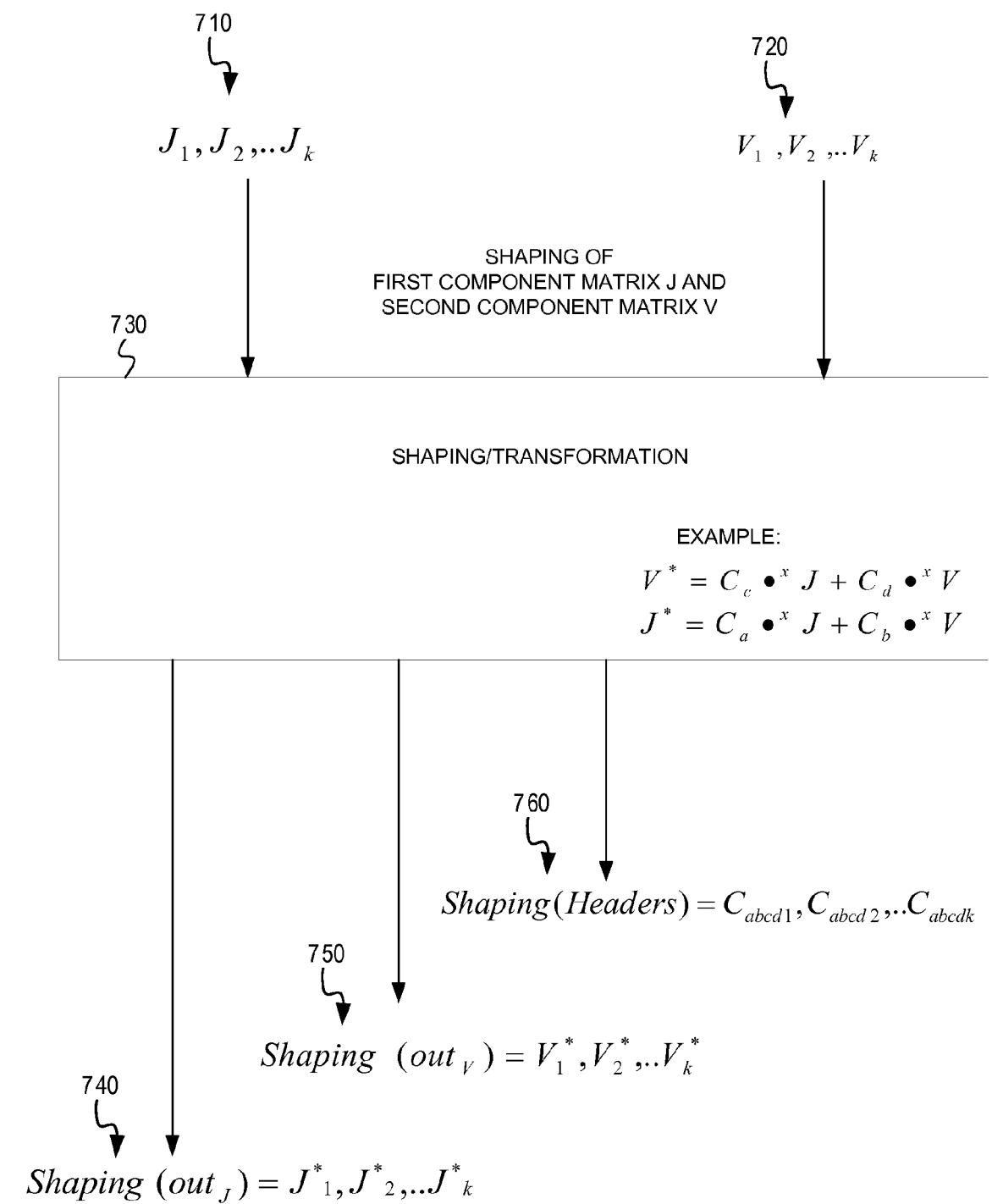
FIG. 7 depicts examples of shaping first and second component matrices in accordance with an embodiment of this disclosure.

FIG. 7 depicts examples of shaping the first and second component matrices. Shaping (or transformation) of the first and second component matrices may result in better compression, obfuscation, or diffusion of the results of eigendecomposition. For example, each first component matrix J from FIG. 6 is a diagonalized matrix of eigenvalues λ. This means that the elements in the diagonal of the first component matrix J are meaningful (eigenvalues λ) and all other elements of the first component matrix J are zeros. The zero elements expand the size of memory needed to convey the eigenvalues but are otherwise unnecessary. One way to compress the first component matrix J is to multiply the first component matrix J with another matrix.

In FIG. 7, the type of shaping and transformation used may be system adjustable, user specified, or dependent upon design considerations. A premise of FIG. 7 is that any shaping or transformation must be reversible. Provided in this description of FIG. 7 is an example of a reversible shaping operation. At 710, a plurality of first component matrices $J_1, J_2, \ldots J_k$, (from eigendecomposition of data matrices $A_1, A_2, \ldots A_k$) may be used in the shaping algorithm. At 720, a plurality of second component matrices $V_1, V_2, \ldots V_k$ are also provided (from the eigendecomposition of data matrices $A_1, A_2, \ldots A_k$).

At block 730, shaping may be performed. A first component matrix J and a second component matrix V are used in this step. While the example is based upon first and second component matrices from the same data matrix, it should be understood that component matrices from different data matrices may be mixed in this operation, so long as the process is reversible. An example of shaping may be represented by the formula $J^* = J^{.x} C_a + V^{.x} C_b$ and a corresponding formula $V^* = J^{.x} C_c + V^{.x} C_d$. Note that the operator $.^x$ represents an element-by-element multiplication of the operands (as compared to a matrix vector multiplication). The shaped first component matrix J* is a reversible permutation based upon the first component matrix J and a portion of the second component matrix V. For example, if the values J*, V*, $C_a$, $C_b$, $C_c$, $C_d$ are known, then the original first component matrix J and second component matrix V could be recovered using the following formulas (where the division operation represents an element-by-element division of the operands):

$$J = \frac{\frac{J^*}{C_b} - \frac{V^*}{C_d}}{\frac{C_a}{C_b} - \frac{C_c}{C_d}}$$

$$V = \frac{\frac{J^*}{C_a} - \frac{V^*}{C_c}}{\frac{C_b}{C_a} - \frac{C_d}{C_c}}$$

In some implementations, one or more of the values $C_a$, $C_b$, $C_c$, $C_d$ may be null. As an example, in the formula $J^*=J \cdot^x C_a + V \cdot^x C_b$, the value of $C_b$ may be all zeros so that the shaped first component matrix J* does not contain a portion of the second component matrix V. In other examples, the values $C_a$, $C_b$, $C_c$, $C_d$ may be system adjustable, user-provided, or randomly generated values.

The results of the shaping operation at block 730 include a shaped first component matrix J* based at least in part upon the first component matrix J, a shaped second component matrix V* based at least in part upon the first component matrix V, and one or more values $C_a$, $C_b$, $C_c$, $C_d$ (collectively referred to as $C_{abcd}$). In the scenario where a plurality of first component matrices $J_1, J_2, \ldots J_k$, 710 and a plurality of second component matrices $V_1, V_2, \ldots V_k$ 720 are used in the shaping, the output may include a plurality of shaped first component matrices $J^*_1, J^*_2, \ldots J^*_k$ (indicated at arrow 740), a plurality of shaped second component matrices $V^*_1, V^*_2, \ldots V^*_k$ (indicated at arrow 750), and a plurality of shaping values $C_{abcd1}, C_{abcd2}, \ldots C_{abcdk}$ (indicated at arrow 760).

As stated above, the example shaping algorithm described above is merely an example. Any function having a corresponding inverse function may be used at block 730 to shape, transform, compress, or alter the first and second component matrices. The resulting shaped first and second component matrices are based upon the first and second component matrices, respectively, and may also be based upon the other of the first and second component matrices. Any algorithm used to shape the first and second component matrices should be reversible so that the shaped first and second component matrices are decipherable to obtain the first and second component matrices.

Figure 8:
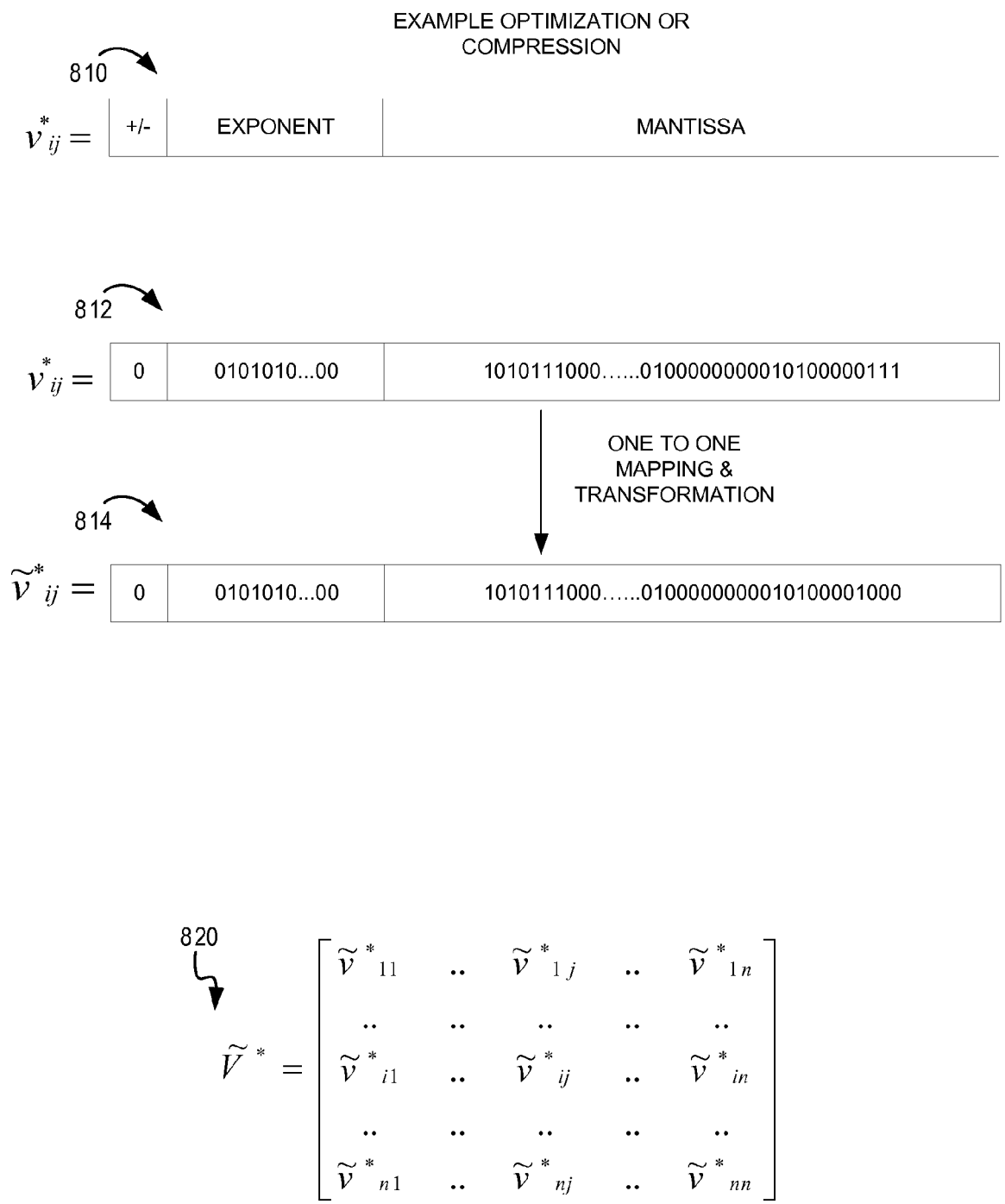
FIG. 8 depicts an example of optimizing or compressing a component matrix in accordance with an embodiment of this disclosure.

FIG. 8 depicts an example of optimizing or compressing a component matrix. At 810, an example element $v^*_{ij}$ is a floating point number element in the second component matrix V*. Similar to the floating point number described above, the value includes a sign bit, an exponent portion, and a mantissa portion. At 812, the same example element $v^*_{ij}$ is shown with example data populated. In one method of compression, the least significant bit or bits of the mantissa may be truncated or rounded. This may result in a rounding of the number. For example, the last four bits in the example element $v^*_{ij}$ 812 are "0111." In an example, rounding may be used to compress the example element $v^*_{ij}$ 812 by truncating the last three bits. After rounding at the fourth bit, the value may be changed to "1000" in the compressed element $\tilde{v}^*_{ij}$ at 814. Later, the last three zero bits may be removed from the transmitted message and restored later at the receiving device. Optimization and compression procedures for the elements in matrix J and V might be different. For example, the procedures may utilize differing amounts of truncating or rounding for each component matrix.

Even though the mantissa may be truncated or rounded, it may still be possible to recover the corresponding element $v_{ij}$ (the value of the element prior to shaping). Rounding is possible because of the amount padding done during the data formatting step. The resulting value of the compressed example element $v^*_{ij}$ is shown as compressed element $\tilde{v}^*_{ij}$ at 814.

It should be understood that other algorithms for compression may be used. For example, one-to-one mapping, transformation, or code point compression may be used. In one embodiment, lossless compression is preferred over lossy data compression. Lossless compression may include techniques such as Lempel-Ziv (LZ) compression, DEFLATE, Burrows-Wheeler transform, prediction by partial matching, grammar-based codes, or arithmetic coding.

FIG. 9 depicts another example of optimization that may be used, particularly with the second component matrix (based on eigenvectors). Because the eigenvectors define the vector space and represent vectors, the eigenvectors can be modified in a consistent way without destroying the relationship between the vectors. For example, dividing all elements in the second component vector by the same value would not alter the relationship between the vectors as compared to each other. One method of compression may exploit this relationship and provide some compression of the data, as shown in FIG. 9.

At 910, a second component matrix V includes values $v_{11} \ldots v_{33}$ (in this example, a 3×3 square matrix is shown). At 920, a compressed second component matrix $\tilde{V}$ is shown. The compression is based on dividing all elements in each column by the first value in that column. For example elements $v_{11}$, $v_{21}$, $v_{31}$ of the first column are divided by the first element $v_{11}$ in that column. Similarly the elements in column 2 are divided by the first element in column 2, and similarly the elements in column 3 are divided by the first element in column 3. The result of this division is shown at 930, where the compressed second component matrix $\tilde{V}$ has all ones in the first row. Since the division was consistent in each column, the vector space represented by $\tilde{V}$ has not been altered. And because the first row includes all ones, it can be eliminated from the matrix when the matrix is used to generate the message payload. When the message is parsed, the recipient can add the first row of all ones to reverse the operation.

It should be noted that the example in FIG. 9 is based upon division by the first element in each column. A similar scheme could use division based upon the first element in each row. Other patterns or predetermined operations could be used to modify elements of the second component matrix uniformly to result in a vector space with fixed values in at least some of the elements of the second component matrix. As noted above, this form of compression is intended for use with the eigenvectors resulting from eigendecomposition.

FIG. 10 depicts an example of generating first and second messages. After the eigendecomposition, and any shaping or compression algorithms, the resulting matrices represent separately transmittable indecipherable parts of the original data. The resultant shaped, compressed, first component matrix $\tilde{J}^*$ (shown at 1020) is based upon the first component matrix J (of eigenvalues). The resultant shaped, compressed, second component matrix $\tilde{V}^*$ (shown at 1040) is based upon the second component matrix V (of eigenvectors). The elements in each of the matrices J̃* 1020, Ṽ* 1040 are still floating point numbers (or complex values double floating point numbers, in an example implementation). A function u can be used to generate a message based upon each component matrix. For example, function u at 1022 is used to generate a first message 1030 based upon the first component matrix J (or J̃* 1020 as shown in the figure). Function u at 1042 is used to generate a second message 1050, different from the first message 1030, based upon the second component matrix V (or Ṽ* 1040 as shown in the figure). It should be understood that the first message 1030 and/or second message 1050 may have other parts or information. For example, a payload portion of the first message 1030 may include the data based on the first component matrix, while other portions of the first message 1030 may include headers, signatures, checksums, or other information.

FIG. 10 also shows an example of how the messages may be generated based upon the elements in the component matrices. At 1012, an example element $\tilde{v}^*_{ij}$ is shown with some example data. The bits of the example element may be translated into a bit stream as part of the payload of the generated message. For example, at 1014 a function $u_{ij}$ selects bits from the example element and creates the bit stream at 1016. It should be understood that that bits from the elements in a component matrix may be serialized in the order they are for each floating point number. Alternatively, a known sequencing of the bits may be used. In one example, a substitution and/or permutation algorithm may be used to translate the bits from each element in the matrix into a payload portion of the generated message. In an example where each element is treated separately, the elements may be translated to the bit stream based upon rows, columns, or a predetermined pattern. Alternatively, a pseudorandom pattern may be used, and a value indicating the pseudorandom pattern may be collected and added to the auxiliary headers described previously.

Figure 11:
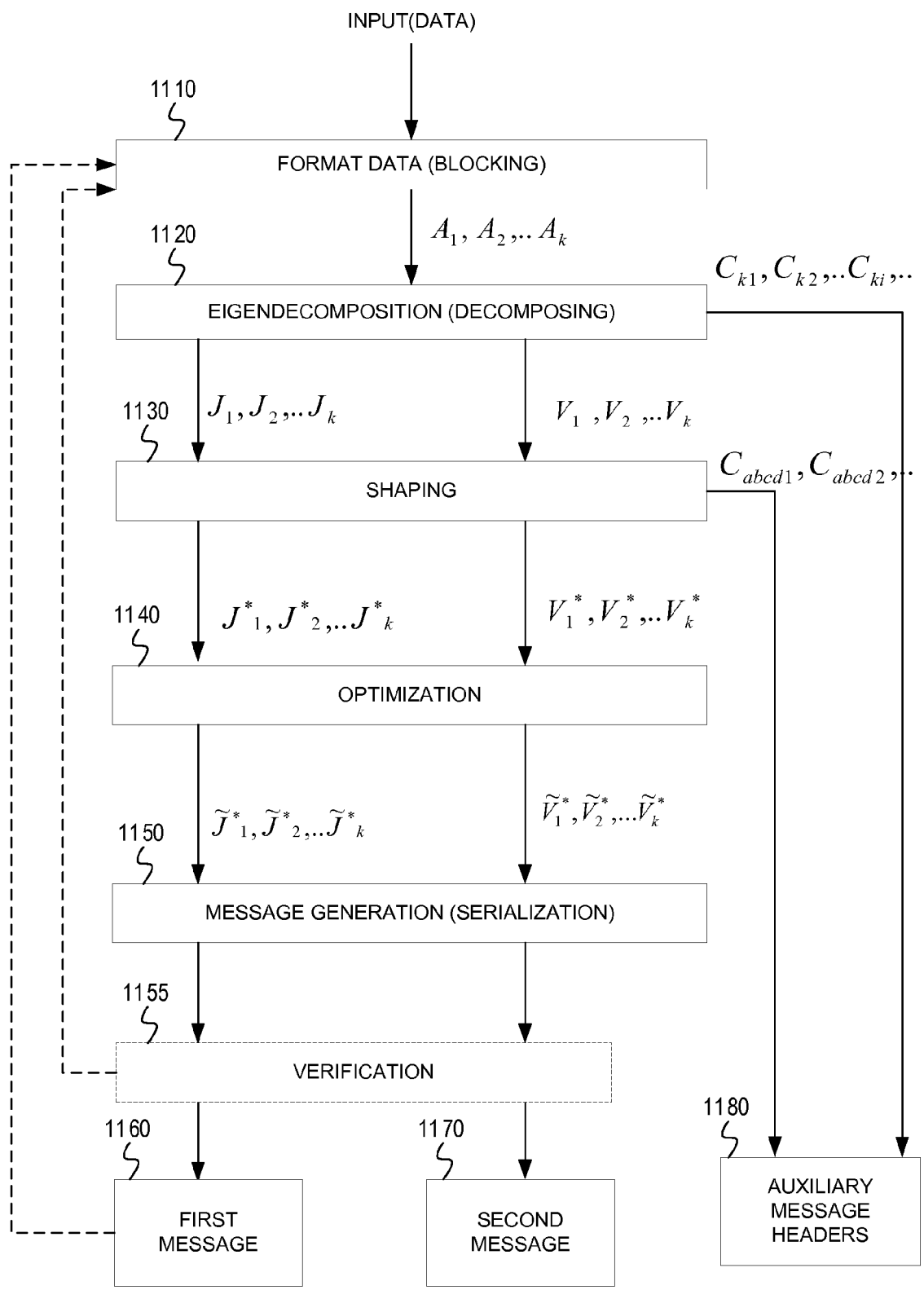
FIG. 11 depicts an example flowchart with a plurality of matrices in accordance with an embodiment of this disclosure.

FIG. 11 depicts an example flowchart with a plurality of matrices. At block 1110, input data is formatted into a plurality of data matrices. Other terms for this step may include blocking, segmenting, arranging, or typecasting. At block 1120, eigendecomposition is performed on each of the plurality of data matrices to generate a corresponding plurality of first component matrices and a corresponding plurality of second component matrices. During the eigendecomposition process, the first and second component matrices may be checked to ensure that fidelity of eigencomposition is accurate. The eigendecomposition process may be repeated, if necessary, by transforming a data matrix to ensure that the resulting first and second component matrices will result in an accurate eigencomposition. Information about the transformation (such as the values of any constants $C_k$) is saved for later use.

At block 1130, the plurality of first component matrices and the plurality of second component matrices may be shaped, such as the process described in FIG. 7. Information about the shaping (such as optional parameters, or shaping values $C_{abcd}$) is saved for later use. At block 1140, optimization may be performed on the pluralities of first and second component matrices, such as the processes described in FIGS. 8 and/or 9.

At block 1150, a first message 1160 and a second message 1170 are generated based upon the plurality of first component matrices and the plurality of second component matrices, respectively. Auxiliary headers 1180 may also be generated based upon the information from the previous steps of data formatting, 1110, eigendecomposition 1120, shaping 1130, and/or optimization 1140. For example, the constants $C_k$ and/or shaping values $C_{abcd}$ for each data matrix may be serialized to generate auxiliary information. The auxiliary information may be appended as headers to the first message or the second message. Alternatively, the auxiliary information may be transmitted or stored as a separate third message, different from the first and second messages.

At block 1155, a verification process may be performed. For example the verification process may be used to confirm that the original input data may be properly recovered from first and second component matrices resulting from eigendecomposition, shaping, optimization, and data serialization. In an implementation, the verification process is the same as decryption process used to recover the original data from first and second message, such as the decryption process described in FIG. 13. The output data from the decryption process is compared to the input data to verify that they match. These comparisons and verifications may be done on a block-by-block basis. Possible reasons the verification may fail include either too little padding or too much compression. In some systems, the amount of padding used during data formatting is proportional to the amount of compression that can be performed. If the verification process fails, then the amount of padding may need to be increased or the amount of compression may need to be decreased. In one implementation, if verification process fails (i.e. decryption of the first and second messages results in inaccurate data) then the first and second messages are discarded and the process is repeated (using different padding or compression parameters) for the same block of input data. The amount of padding may be variable, and therefore an indicator in the auxiliary message headers may be used to indicate the amount of padding used for all or some of the data blocks. It may be desirable to alter the amount of padding used in the data blocks for other reasons, such as data security for the first or second messages.

In FIG. 11, the algorithm may be iteratively performed. The first message 1160 may be used as further source input data to the data formatting at block 1110, and the process repeated. The iteration of the eigendecomposition cipher is further described in relation to FIG. 12.

FIG. 12 depicts some charts showing calculations associated with various algorithms in this disclosure. A first chart 1210 shows calculations associated with data expansion resulting in eigendecomposition cipher. In the first chart 1210, an example data matrix size of 8×8 is calculated. Various sizes of data matrixes may be used and data expansion calculated in a similar way as described here for an 8×8 data matrix. In the example calculations, the data elements in the data matrix are double floating point complex numbers. Each double floating point number is represented by 64 bits in computer memory. A complex double floating point number has a real part of 64 bits and an imaginary part of 64 bits. In the example calculations, 14 bits of padding are used, (e.g. 4 bits of leading zeros in exponent and 10 bits of trailing zeros in the mantissa). In other words, for every 64 bits in the data matrix, 50 bits carry actual data. The resulting data expansion would be expected to be 28% increase (64/50=1.28).

With the above parameters described, the example calculations are possible. In an 8×8 data matrix, there are 64 elements. However, because both real and imaginary numbers are included in the matrix, the resulting number of values associated with the 8×8 data matrix is 128 double floating point numbers. The amount of data that can be stored in 128 numbers is 6400 bits (128 numbers×(64 bits per number−14 bits padding)=6400 bits). Therefore, the 8×8 data matrix will carry 6400 bits of input data.

Upon performing eigendecomposition, a first component matrix J and a second component matrix V are generated. The first component matrix J is a diagonalized matrix with only eigenvalues. Because it is a diagonalized matrix, there should only be exactly 8 eigenvalues for an 8×8 data matrix. Each of the 8 eigenvalues will be double-precision complex floating point numbers. Therefore, the first component matrix (shaped, so as to remove all zeros) will be 1024 bits (64 bits per element×8 elements×2 (real and imaginary)=1024 bits). The second component matrix V will have 8192 bits (64 bits per element×64 elements×2 (real and imaginary)=8192 bits). However, the second component matrix V may be compressed by dividing the elements in each column (or row) by the first element in each column (or row). This would result in all ones in the first row (or column) which doesn't need to be included in the second message. When accounting for this type of compression, the size of the second component matrix V would be 7×8 and would result in a payload size of 7168 bits (64 bits per element×56 elements×2 (real and imaginary) =7168).

For the first data matrix having 6400 bits of input data, the resulting first message of 1024 bits and second message of 7168 bits would result in a 28% increase (1024 bits+7168 bits=8192 bits; 8192 bits/6400 bits=1.28). Another way to consider the data expansion is to consider the effect over a plurality of data matrices and a large input data file. For example, an original input data file of 100 Mb would result in a first message payload of 16 Mb and a second message payload of 112 Mb.

As described earlier the first message payload represents the eigenvalues component of the source data, while the second message payload represents the eigenvectors component of the source data. Both components are needed to reconstruct the original source data. However, due to the size differences and the nature of the eigendecomposition, the first message payload may be considered a key portion, while the second message payload may be considered an encrypted (or encoded, ciphered, indecipherable, etc.) portion. It may be desirable to further reduce the size of the first message payload so that the key portion can be kept small enough for storage on an unlocking device, memory card, or user memory. It may be possible to reduce the size of the first message payload by iteratively repeating the eigendecomposition cipher.

At chart 1220, a table shows how the process may be repeated iteratively, starting with a source file of 100 Mb. At the first iteration, the source file of 100 Mb is eigendecomposed to result in a first component message payload of 16 Mb and a second component message payload (1231) of 112 Mb. The first component message payload from the first iteration may be used as the input data for the second iteration. In the second iteration the input data of 16 Mb is eigendecomposed to result in a new first component message payload of 2.56 Mb and a further second component message payload (1232) of 17.92 Mb. The first component message payload from the second iteration may be used as the input data for the third iteration, and so one. In the fifth iteration the input data size is 0.065536 Mb (this is the size of the first component message payload from the fourth iteration). The input data in the fifth iteration is eigendecomposed to result in a new first component message payload of 0.01048576 Mb and a further second component message payload (1235) of 0.07340032 Mb.

Therefore, the source data was eigendecomposed iteratively, resulting in five components (1240, 1231-1235). Each of the components is needed to reconstruct the original source data. However, the components may be store or transmitted separately. And any one of the components by itself is indecipherable without the other components. At the smallest level, the first component message payload 1240 from the last iteration is a key portion needed before the second component message payload 1235 of the last iteration can be deciphered. The source data from the last iteration must be deciphered before the first component payload of the previous iteration can be determined. Therefore, the 100 Mb file may be indecipherable without the 0.01 Mb (10 k) component portion representing the eigenvalues from the fifth iteration. The sum of all components through the five iterations is just over 133 Mb (sum of the sizes from portions 1240, 1231-1235; excluding the effect of headers and other auxiliary information).

Figure 13:
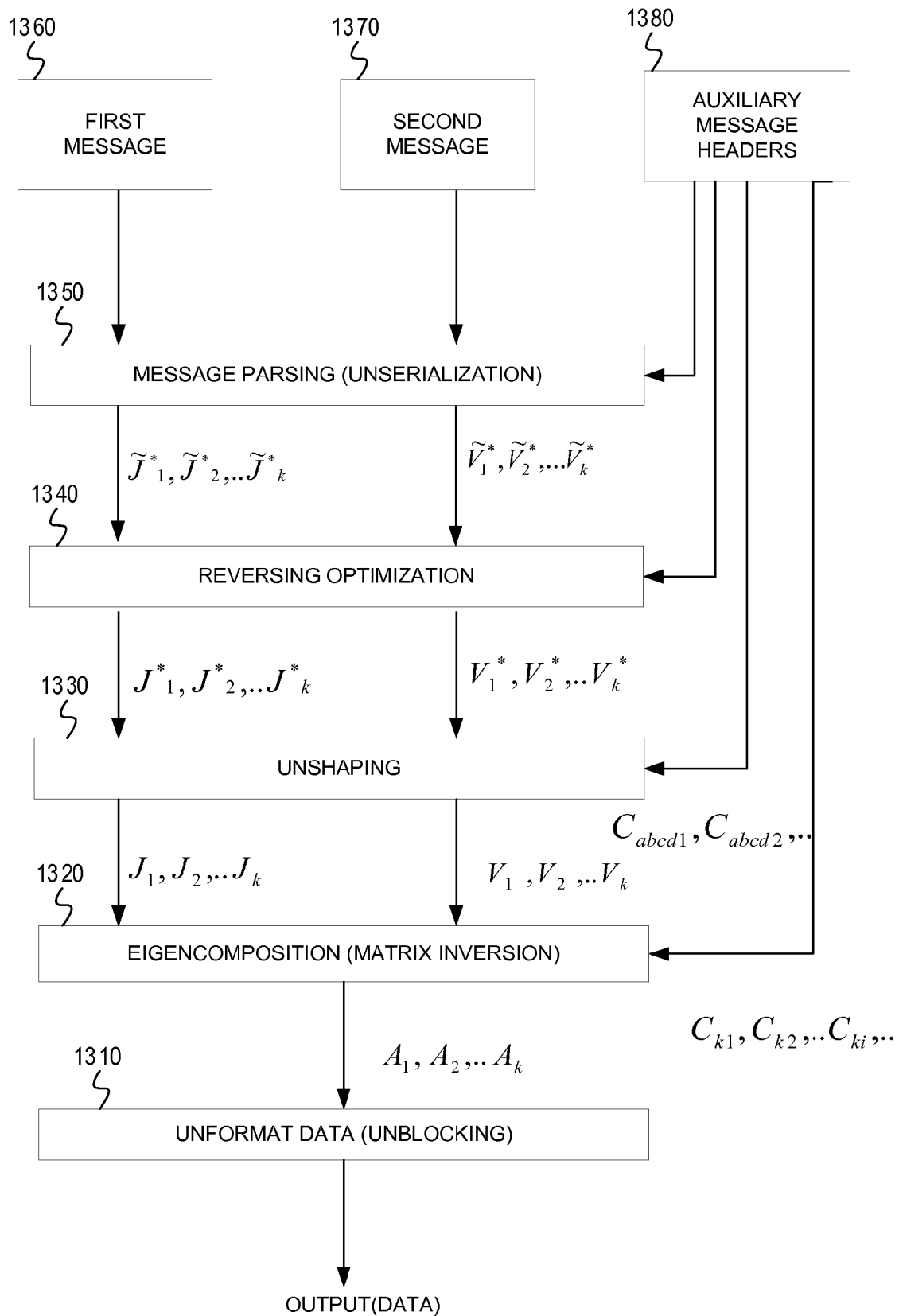
FIG. 13 depicts an example of recovering original data based upon first and second messages in accordance with an embodiment of this disclosure.

FIG. 13 depicts an example of recovering original data based upon first and second messages in accordance with an embodiment of this disclosure. The process of recovering the original data is essentially the inverse of the process used to create the first and second messages (such as the process described in FIG. 11). Any reversible permutations or combinations may be also be performed. In some implementations, auxiliary message headers 1380 include indicators or parameters which identify system configurable or user configurable options that were used in the original generation of the first message 1360 and the second message 1370.

The decryption (e.g. data recovery) process begins with the first message 1360, the second message 1370, and the auxiliary message headers 1380 being collected at the processor that will perform the decryption process. As described previously, these constituent pieces may be collected from a variety of storage media or via disparate communication networks. The first and second messages 1360, 1370 are parsed at block 1350. Message parsing is used to "unserialize" the data payload of the messages in a reverse of the method used to serialize the data payload as described previously (e.g. with regard to FIG. 10). As a result of the message parsing, a plurality of compressed first component matrices and a plurality of compressed second component matrices are recovered. Each compressed first component matrix and corresponding compressed second component matrix are used in the remaining blocks 1340, 1330, 1320, 1310 to recover blocks of output data.

At block 1340 the compressed first component matrix and compressed second component matrix are uncompressed. Any optimization or compression processes (such as those described in FIGS. 8-9) are reversed to recover the resulting shaped first component matrix and shaped second component matrix. The shaped first and second component matrices are used as inputs to block 1330. At block 1330, the shaped first and second component matrices are unshaped. Any shaping processes (such as those described in FIG. 7) are reversed to recover the first and second component matrices. It should be understood that if the shaping process in FIG. 7 included the use of constants, the constants may be recovered from the auxiliary message headers and used in the unshaping process.

At block 1320, eigencomposition is used to recover a data matrix associated with each first and second component matrix. Specifically, the eigencomposition may be performed by the formula: $A^* = V \cdot J \cdot V^{-1}$) where the first component matrix J has eigenvalues $\lambda$ and the second component matrix V has eigenvectors. If the resulting data matrix is associated with a modification (such as a constant conveyed the auxiliary message headers), the modification is also reversed. As a result, a first data matrix A is recovered as a result of block 1320.

At block 1310, the data matrix may be translated (e.g. unblocked, unformatted, or other such terms) into a data stream. The unblocking process may be the reverse of a data blocking process (such as described in FIGS. 3-5). After performing the blocks 1340, 1330, 1320, 1310 for each of the plurality of recovered compressed first and second component matrices, the resulting output is collected into a data stream that mirrors the original input data stream that was used to generate the first message 1360, second message 1370, and auxiliary message headers 1380.

It should be understood that FIGS. 1-13 are examples meant to aid in understanding embodiments and should not be used to limit embodiments or limit scope of the claims. Embodiments may comprise additional circuit components, different circuit components, and/or may perform additional operations, fewer operations, and operations in a different order, operations in parallel, and some operations differently. It should be understood that although examples refer to eigendecomposition, embodiments are not so limited. In other embodiments, other types of matrix decomposition or spectral decomposition may be used to generate unrecognizable component parts of the data.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wire line, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider)

Figure 14:
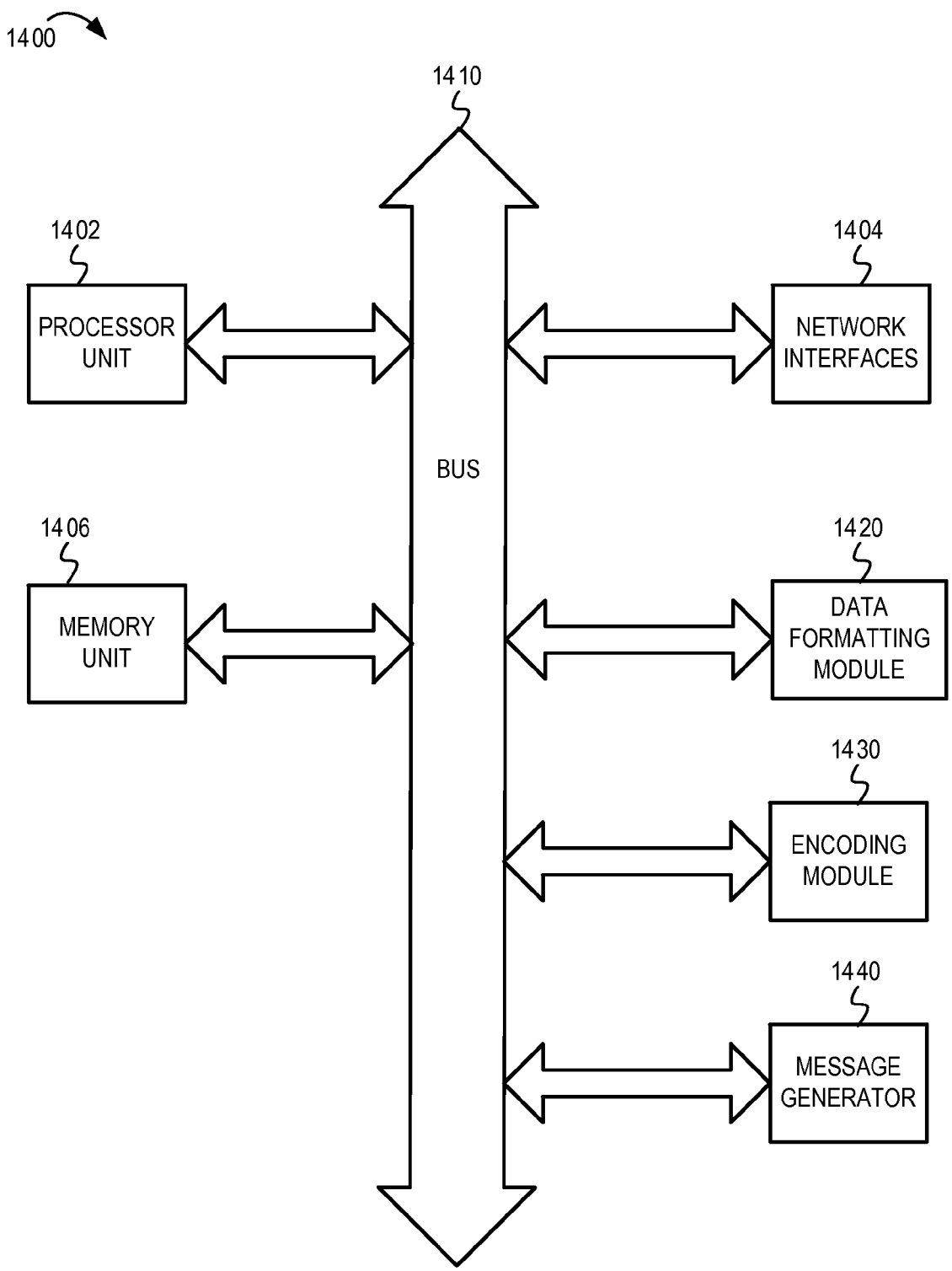
FIG. 14 is an example block diagram illustrating an apparatus capable of securely transmitting or storing data in first and second messages in accordance with an embodiment of this disclosure.

FIG. 14 is an example block diagram of one embodiment of an example first apparatus 1400 capable of generating first and second messages for the secure transmission of data to a second apparatus. In some implementations, the first apparatus 1400 may be an electronic device such as a laptop computer, a tablet computer, a mobile phone, a router, a network node, a gaming console, or other electronic systems comprising functionality to communicate across one or more communication networks. The first apparatus 1400 includes a processor unit 1402 (possibly including multiple processors, multiple cores, multiple nodes, and/or implementing multithreading, etc.). The first apparatus 1400 includes a memory unit 1406. The memory unit 1406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The first apparatus 1400 also includes a bus 1410 (e.g., PCI, ISA, PCI-Express, HyperTransport®, InfiniBand®, NuBus, AHB, AXI, etc.), and network interfaces 1404 that include at least one of a wireless network interface (e.g., a WLAN interface, a Bluetooth® interface, a WiMAX interface, a ZigBee® interface, a Wireless USB interface, etc.) and a wired network interface (e.g., an ATM interface, an Ethernet interface, a Frame Relay interface, SONET interface, etc.). In some implementations, the first apparatus 1400 can comprise a plurality of network interfaces—each of which couples the first apparatus 1400 to a different communication network.

The memory unit 1406 embodies functionality to implement embodiments described above. The memory 1406 may include one or more functionalities that facilitate cryptographic communication based on eigendecomposition of a numerical representation of source data. Any one of these functionalities may be partially (or entirely) implemented in hardware and/or on the processor unit 1402. For example, the functionality may be implemented with an application specific integrated circuit, in logic implemented in the processor unit 1402, in a co-processor on a peripheral device or card, etc. Further, realizations may include fewer or additional components not illustrated in FIG. 14 (e.g., video cards, audio cards, additional network interfaces, peripheral devices, etc.). The processor unit 1402, the memory unit 1406, and the network interfaces 1404 are coupled to the bus 1410. Although illustrated as being coupled to the bus 1410, the memory unit 1406 may be coupled to the processor unit 1402.

While the embodiments are described with reference to various implementations and exploitations, it will be understood that these embodiments are illustrative and that the scope of the inventive subject matter is not limited to them. In general, techniques for information security based on eigendecomposition as described herein may be implemented with facilities consistent with any hardware system or hardware systems. Many variations, modifications, additions, and improvements are possible.

In some implementations, a method comprises: encoding a first portion of data in a first message, the first portion based upon eigenvalues of a numerical representation of the data; encoding a second portion of the data in a second message, the second portion based upon eigenvectors of the numerical representation of the data; and separately transmitting the first and second messages to a recipient capable of recovering the data from the first and second messages.

In some implementations, the first message is transmitted over a first communication media and the second message is transmitted over a second communication media.

In some implementations, the first message is smaller than the second message.

In some implementations, the method further comprises: calculating the eigenvalues of the numerical representation of the data; verifying if the data may be recovered based on the eigenvalues and eigenvectors; and if the data may not be recovered based on the eigenvalues and eigenvectors, modifying the numerical representation of the data such that the resulting eigenvalues and eigenvectors may be used to recover the data.

In some implementations, an apparatus comprises: an encoding module configured to encode a first portion of data in a first message, the first portion based upon eigenvalues of a numerical representation of the data; the encoding module configured to encode a second portion of the data in a second message, the second portion based upon eigenvectors of the numerical representation of the data; and message generator configured to separately transmit the first and second messages to a recipient capable of recovering the data from the first and second messages.

In some implementations, a method comprises: receiving a plurality of messages and generating at least a first component matrix and a second component matrix therefrom; calculating at least a first data matrix based upon an eigencomposition of the at least first and second component matrices; and generating a data stream based on at least the first data matrix.

In some implementations, an apparatus comprises: a message parser configured to receive a plurality of messages and generate at least a first component matrix and a second component matrix therefrom; a decoding module configure to calculate at least a first data matrix based upon an eigencomposition of the at least first and second component matrices; and a data restore module configured to generate a data stream based on at least the first data matrix.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a first computer system, the method comprising:
    formatting a source data file as values of at least a first data matrix;
    calculating, based on eigendecomposition of the first data matrix, at least an eigenvalue matrix and an eigenvector matrix;
    modifying the first data matrix and repeating said calculating after modifying the first data matrix in response to determining that the eigenvalue matrix does not have a canonical form with all zeros in a super diagonal of the first data matrix;
    generating a first partial data file based upon the eigenvalue matrix;
    generating a second partial data file based upon the eigenvector matrix; and
    transmitting at least one of the first and second partial data files to a second computer system different from the first computer system, wherein the first and second partial data files comprise separately transmittable parts of the source data file.

2. The method of claim 1, wherein the canonical form is a Jordan normal form.

3. The method of claim 1, wherein the first data matrix is a square matrix and the canonical form is a diagonalized normal form.

4. The method of claim 1, wherein said formatting the source data file comprises:
    loading the source data file as a plurality of floating point numbers; and
    storing ones of the plurality of floating point numbers as the values of the first data matrix.

5. The method of claim 4, wherein said loading comprises:
    padding a part of an exponent portion of each floating point number;
    loading bits from the source data file in the exponent portion of each floating point number; and
    loading bits from the source data file into at least a part of a mantissa portion of each floating point number.

6. The method of claim 4, wherein said storing comprises:
    storing the ones of the plurality of floating point numbers sequentially as the values of the first data matrix.

7. The method of claim 1, wherein said formatting the source data file comprises formatting the source data file into a series of data matrices based upon a size of the source data file.

8. The method of claim 1,
    wherein modifying the first data matrix comprises using a transformation based at least in part on a predetermined value.

9. The method of claim 1, wherein generating the first partial data file comprises:
    compressing the eigenvalue matrix, wherein said compressing includes one or more of the following operations:
        shaping the eigenvalue matrix based upon a predetermined reversible operation,
        applying a bit-level transformation to values of the eigenvalue matrix,
        truncating values of the eigenvalue matrix,
        rounding values of the eigenvalue matrix, or
        serializing values of the eigenvalue matrix into a bit stream included in the first partial data file.

10. The method of claim 1, wherein the first partial data file is constructed using a reversible permutation or combination based upon the eigenvalue matrix and a portion of the eigenvector matrix.

11. The method of claim 1, further comprising:
    iteratively repeating the operations of formatting the source data file, calculating, determining, and generating the first and second partial data files,
        wherein the eigenvalue matrix is used as the source data file for a subsequent iteration.

12. The method of claim 1, further comprising:
    generating auxiliary headers having information describing transformations or formatting used for the first data matrix, the eigenvalue matrix, or the eigenvector matrix.

13. The method of claim 12, wherein the auxiliary headers are included in either the first partial data file or the second partial data file.

14. The method of claim 12, wherein the auxiliary headers are stored or transmitted separately from the first partial data file and the second partial data file.

15. A first computer system, comprising:
a processor; and
memory having instructions stored therein which, when executed by the processor, cause the first computer system to perform operations comprising:
formatting a source data file as values of at least a first data matrix,
calculating, based on eigendecomposition of the first data matrix, at least an eigenvalue matrix and an eigenvector matrix,
modifying the first data matrix and repeating said calculating after modifying the first data matrix in response to determining that the eigenvalue matrix does not have a canonical form with all zeros in a super diagonal of the first data matrix,
generating a first partial data file based upon the eigenvalue matrix,
generating a second partial data file based upon the eigenvector matrix, and
transmitting at least one of the first and second partial data files to a second computer system different from the first computer system, wherein the first and second partial data files comprise separately transmittable parts of the source data file.

16. The first computer system of claim 15, wherein the canonical form is a Jordan normal form.

17. The first computer system of claim 15, wherein the first data matrix is a square matrix and the canonical form is a diagonalized normal form.

18. The first computer system of claim 15, wherein said formatting
loading the source data file as a plurality of floating point numbers; and
storing ones of the plurality of floating point numbers as the values of the first data matrix.

19. The first computer system of claim 18, wherein said loading comprises:
padding a part of an exponent portion of each floating point number;
loading bits from the source data file in the exponent portion of each floating point number; and
loading bits from the source data file into at least a part of a mantissa portion of each floating point number.

20. The first computer system of claim 15, wherein modifying the first data matrix comprises using a transformation based at least in part on a predetermined value.

21. A non-transitory machine-readable medium having instructions stored therein which, when executed by a processor, cause the processor to perform operations that comprise:
formatting a source data file as values of at least a first data matrix,
calculating, based on eigendecomposition of the first data matrix, at least an eigenvalue matrix and an eigenvector matrix,
modifying the first data matrix and repeating said calculating after modifying the first data matrix in response to determining that the eigenvalue matrix does not have a canonical form with all zeros in a super diagonal of the first data matrix,
generating a first partial data file based upon the eigenvalue matrix,
generating a second partial data file based upon the eigenvector matrix, and
transmitting at least one of the first and second partial data files, wherein the first and second partial data files comprise separately transmittable parts of the source data file.

22. A method comprising:
formatting a source data file as a plurality of data matrices;
for each data matrix of the plurality of data matrices:
calculating an eigendecomposition of the data matrix to determine an eigenvalue matrix and an eigenvector matrix, and
determining whether the eigenvalue matrix has a canonical form with all zeros in a super diagonal of the eigenvalue matrix, and if the eigenvalue matrix does not have all zeros in the super diagonal then modifying the data matrix by a predetermined constant and repeating said calculating and determining operations;
processing the eigenvalue matrices and eigenvector matrices associated with the plurality of data matrices, said processing including at least one of shaping, compression, truncation, or encryption;
transmitting a first message based upon the eigenvalue matrices; and
transmitting a second message based upon the eigenvector matrices,
wherein the first and second messages comprise separately transmittable parts of the source data file.

23. A method performed by a decrypting system, the method comprising:
obtaining a first partial data file and a second partial data file, wherein the first and second partial data files comprise separately obtained parts of a source data file;
determining an eigenvalue matrix based at least in part on the first partial data file;
determining an eigenvector matrix based at least in part on the second partial data file;
calculating a first data matrix, based on eigencomposition of at least the eigenvalue matrix and the eigenvector matrix;
unformatting at least the first data matrix to recover the source data file; and
storing the source data file in a memory of the decrypting system.

24. The method of claim 23, wherein said obtaining includes receiving the first and second partial data files via separate transmission paths of one or more networks.

25. The method of claim 23, wherein said obtaining includes retrieving at least one of the first partial data file and the second partial data file from a storage device.

26. The method of claim 23, further comprising performing unshaping or uncompression procedures on at least one of the eigenvalue matrix and the eigenvector matrix.

27. The method of claim 23, wherein unshaping and uncompression procedures includes one or more of the following operations:
unshaping the eigenvalue matrix based upon a predetermined reversible operation,
applying a bit-level transformation to values of the eigenvalue matrix,
reversing a truncating or rounding procedure for values of the eigenvalue matrix, or
unserializing a bit stream included in the first partial data file to populate values of the eigenvalue matrix.

28. An apparatus comprising:
a processor; and
memory having instructions stored therein which, when executed by the processor, cause the apparatus to:

obtain a first partial data file and a second partial data file, wherein the first and second partial data files comprise separately obtained parts of a source data file, determine an eigenvalue matrix based at least in part on the first partial data file, determine an eigenvector matrix based at least in part on the second partial data file, calculate a first data matrix, based on eigencomposition of at least the eigenvalue matrix and the eigenvector matrix, unformat at least the first data matrix to recover the source data file, and store the source data file in the memory.

29. The method of claim 1, wherein said transmitting at least one of the first and second partial data files comprises:

transmitting a first message based upon the first partial data file to the second computer system; and transmitting a second message based upon the second partial data file to the third computer system.

30. The method of claim 1, wherein formatting the source data file as values of at least the first data matrix comprises:

formatting the source data file as a series of complex floating point numbers; and arranging the series of complex floating point numbers as a plurality of data matrices.

31. The method of claim 1, wherein the source data file comprises at least one of text, video, audio, or image data.

* * * * *